(12) United States Patent
Takahashi et al.

(10) Patent No.: US 10,209,926 B2
(45) Date of Patent: Feb. 19, 2019

(54) STORAGE SYSTEM AND CONTROL METHOD THEREFOR

(71) Applicant: Hitachi, Ltd., Tokyo (JP)

(72) Inventors: Masamitsu Takahashi, Tokyo (JP); Yutaka Takata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 15/507,305

(22) PCT Filed: Nov. 18, 2014

(86) PCT No.: PCT/JP2014/080496
§ 371 (c)(1),
(2) Date: Feb. 28, 2017

(87) PCT Pub. No.: WO2016/079804
PCT Pub. Date: May 26, 2016

(65) Prior Publication Data
US 2017/0286019 A1    Oct. 5, 2017

(51) Int. Cl.
*G06F 12/00* (2006.01)
*G06F 3/06* (2006.01)
*G06F 12/0873* (2016.01)

(52) U.S. Cl.
CPC .............. *G06F 3/0665* (2013.01); *G06F 3/06* (2013.01); *G06F 3/065* (2013.01); *G06F 12/00* (2013.01); *G06F 12/0873* (2013.01); *G06F 2212/1024* (2013.01)

(58) Field of Classification Search
CPC ..... G06F 3/0665; G06F 12/0873; G06F 12/00

USPC ......................................................... 711/113
See application file for complete search history.

(56) References Cited

U.S. PATENT DOCUMENTS

2004/0230737 A1* 11/2004 Burton ................ G06F 12/0871
711/3
2012/0311261 A1    12/2012 Mizuno et al.

FOREIGN PATENT DOCUMENTS

WO    2012/164618 A1    12/2012

OTHER PUBLICATIONS

International Search Report of PCT/JP2014/080496 dated Feb. 10, 2015.

\* cited by examiner

*Primary Examiner* — Jae U Yu
(74) *Attorney, Agent, or Firm* — Mattingly & Malur, PC

(57) ABSTRACT

When the storage system according to the present invention receives a request for writing new data to a first logical volume after having received a first pair creating request, the storage system stores the new data in a cache memory. Then when the storage system subsequently receives a second pair creating request, even if the cache memory still has stored therein the data identical to the data that was stored on the first logical volume at the point in time when the storage system received the first pair formation request, and even if this identical data has not yet been copied to the second logical volume, the storage system omits to copy this identical data to the second logical volume.

12 Claims, 16 Drawing Sheets

| PAIR ID 201 | PRIMARY VOL DEV # 202 | SECONDARY VOL DEV # 203 | PAIR TYPE 204 | COPY TYPE 205 | PAIR STATE 206 | PRIMARY VOL COPY BMP # 207 | PRIMARY VOL UPDATE BMP # 208 | SECONDARY VOL COPY BMP # 209 | SECONDARY VOL UPDATE BMP # 310 |
|---|---|---|---|---|---|---|---|---|---|
| 0 | 0x0100 | 0x0300 | NORMAL | COPY MODE | COPYING | 4 | - | 5 | - |
| 1 | 0x0101 | 0x0300 | DIFFERENTIAL | COPY MODE | COPY COMPLETED | 6 | 7 | 8 | 9 |
| 2 | 0x0102 | 0x0302 | DIFFERENTIAL | NO COPY MODE | NOT YET COPIED | 0 | 1 | 2 | 3 |
| 3 | 0x0103 | 0x0303 | NORMAL | NO COPY MODE | NOT YET COPIED | 10 | - | 11 | - |
| . | . | . | . | . | . | . | . | . | . |

| SLOT # | LOCK | HOST DIRTY | PHYSICAL DIRTY | CLEAN | CAW ATTRIBUTE | ... |
|---|---|---|---|---|---|---|
| 0 | 1 | 0 | 1 | 0 | 0 | ... |
| 1 | 1 | 1 | 0 | 0 | 1 | ... |
| 2 | 0 | 0 | 0 | 1 | 0 | ... |
| : | : | : | : | : | : | : |

STORAGE SYSTEM AND CONTROL METHOD THEREFOR

BACKGROUND OF THE INVENTION

This invention relates to snapshot differential copying in a storage system.

Background art in the technical field of this invention includes WO 2012/164618 A1. In Abstract of WO 2012/164618 A1, there is described that "A storage system is provided with a memory region, a cache memory region, and a processor. The memory region stores time relation information that indicates a time relationship of a data element that has been stored into the cache memory region and that is to be written to the logical region and a snapshot acquisition point of time to the primary volume. The processor judges whether or not the data element that has been stored into the cache memory region is a snapshot configuration element based on the time relation information for the data element that is to be written to a logical region of a write destination that conforms to the write request that specifies the primary volume and that has been stored into the cache memory region. In the case in which the result of the judgment is positive, the processor saves the data element to the secondary volume for holding a snapshot image in which the snapshot configuration element is a configuration element, and a data element of a write target is then stored into the cache memory region".

SUMMARY OF THE INVENTION

According to the technology described in WO 2012/164618 A1, whether or not a data element in the cache memory region is a snapshot configuration element is determined based on time relation information that is, for example, snapshot generation information. When the data element is not a snapshot configuration element, saving the data element to the secondary volume is omitted. This cuts short the processing time when the next snapshot is obtained.

However, depending on the mode of processing of obtaining a snapshot, due to an event that occurs while the execution of the saving of a data element that is a snapshot configuration element is held off, the data element may cease to be a snapshot configuration element, or the primary volume and the secondary volume may be inverted, to thereby eliminate the need to save the data element. The technology described in WO 2012/164618 A1 has no way of omitting the saving of a data element that is no longer a snapshot configuration element in such cases.

To solve the foregoing problem, there is provided a storage system, comprising a processor, a processor memory, a cache memory, and a storage apparatus, the storage system being coupled to a host computer in a manner that allows communication between the storage system and the host computer, wherein the storage apparatus has a storage area comprising a first logical volume and a second logical volume, and wherein the processor is configured to: store, in the cache memory, new data when a write request to write the new data in the first logical volume is received after reception of a first pair creating request, which is for storing, in the second logical volume, the same data that is stored in the first logical volume at present; and omit copying, to the second logical volume, data that is in the first logical volume at a time of reception of the first pair creating request when the data that is in the first logical volume at the time of reception of the first pair creating request is stored in the cache memory and is not copied to the second logical volume yet at a time of reception of a second pair creating request for storing present data of one of the first logical volume and the second logical volume in another of the first logical volume and the second logical volume.

According to the one embodiment of this invention, the load of data copying for obtaining a snapshot can be lightened and the processing time can be shortened.

Other objects, configurations, and effects than those described above are revealed in the following description of an embodiment of this invention.

BRIEF DESCRIPTION OF THE DRAWINGS

FIG. 2 is an explanatory diagram of pair information held in a processor memory of this embodiment.

FIG. 3 is an explanatory diagram of differential bitmap information held in the processor memory of this embodiment.

DETAILED DESCRIPTION OF THE PREFERRED EMBODIMENTS

An embodiment of this invention is described below with reference to the accompanying drawings. A storage system according to this embodiment holds off the execution of data copying for creating a snapshot of a logical volume and, under a given condition, omits the data copying.

Figure 1:
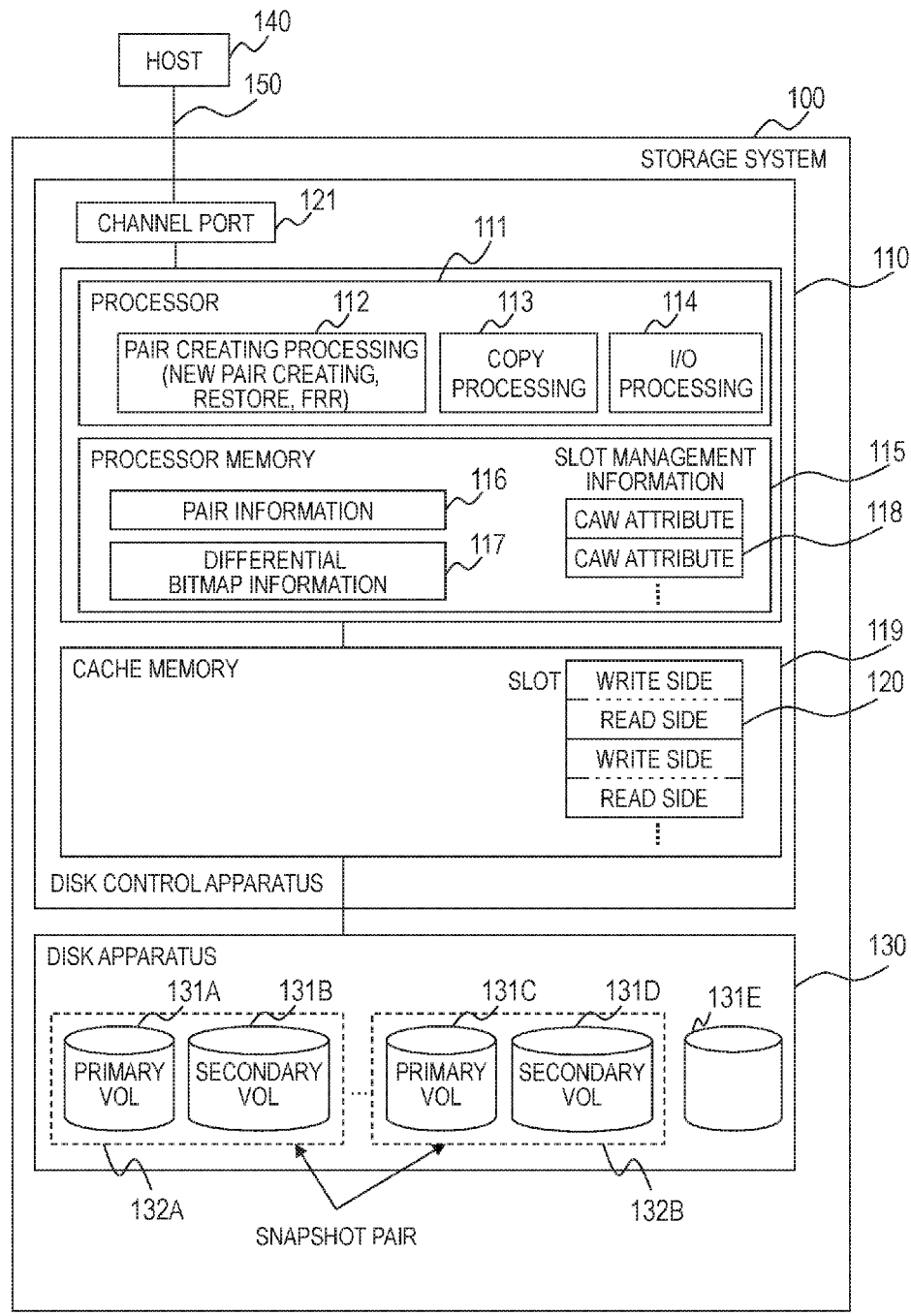
FIG. 1 is a block diagram for illustrating the configuration of a storage system of this embodiment.

FIG. 1 is a block diagram for illustrating the configuration of the storage system of this embodiment.

A storage system 100 of this embodiment includes a disk control apparatus 110 and a disk apparatus 130. The disk control apparatus 110 is an apparatus configured to control data write and read to/from the disk apparatus 130, and includes a processor 111, a processor memory 115, a cache memory 119, and a channel port 121, which are coupled to one another.

The processor 111 includes a pair creating processing module 112, a copy processing module 113, and an I/O processing module 114. Those processing modules are implemented through the execution of programs (not shown) that are stored in the processor memory 115 by the processor 111. Processing executed by the processing modules in the following description is therefore actually executed by the processor 111 as programmed by programs stored in the processor memory 115.

The processor memory 115 stores, in addition to the programs executed by the processor 111, pair information 116, differential bitmap information 117, and slot management information 118. Details of the stored information are described later.

The cache memory 119 is a storage apparatus configured to temporarily store data to be written in the disk apparatus 130 and data read out of the disk apparatus 130. The storage area of the cache memory 119 is divided into and managed as a plurality of slots 120 each having a given storage capacity. Each slot 120 has a write side and a read side as described later.

The channel port 121 is an interface that is coupled to a network 150 to hold communication over the network 150 between the storage system 100 and a host 140.

The disk apparatus 130 is a storage apparatus configured to store data that is requested by the host 140 to be written. The disk apparatus 130 is, for example, one or more hard disk drives (HDDs). Some or all of the HDDs may be replaced by various storage apparatus that include a storage medium (for example, flash memory drives).

The storage area of the disk apparatus 130 is associated with a plurality of logical volumes 131. The logical volumes 131 are logical storage apparatus specified as places where data is written and read by the host 140. Each logical volume 131 may be what is called a real logical volume to which a storage area of the disk apparatus 130 that is equivalent to the entirety of a defined storage capacity is allocated in advance, or may be what is called a virtual logical volume to which a storage area is allocated in response to a write request from the host 140.

In the case where the disk apparatus 130 includes a plurality of HDDs, for example, the storage area of one HDD may be allocated partially or entirely to one logical volume 131, or the storage areas of a plurality of HDDs may be allocated partially or entirely to one logical volume. To give an example, a redundant array of inexpensive disks (RAID) is constructed from a plurality of HDDs included in the disk apparatus 130, and the storage areas of the HDDs that make up the RAID are allocated to the logical volumes 131, respectively.

Logical volumes 131A to 131E are shown in FIG. 1 as an example of the plurality of logical volumes 131. In this embodiment, any two volumes out of the plurality of logical volumes 131 can form a snapshot pair 132 (also may simply be referred to as "pair") as instructed by a command from the host 140. One of the two logical volumes 131 that form one snapshot pair 132 serves as a primary logical volume (primary VOL), and the other serves as a secondary logical volume (secondary VOL).

Pairs 132A and 132B are illustrated in FIG. 1 as examples of the pair 132. The pair 132A is formed of the logical volumes 131A and 131B, of which the logical volume 131A is the primary VOL and the logical volume 131B is the secondary VOL. The pair 132B is formed of the logical volumes 131C and 131D, of which the logical volume 131C is the primary VOL and the logical volume 131D is the secondary VOL.

The host 140 is a computer coupled to the storage system 100 via the network 150, and configured to output a command for writing or reading data to/from the storage system 100, a command for creating a logical volume pair to be described later, and other commands. The host 140 includes, though not shown in FIG. 1, an interface coupled to the network 150, a processor coupled to the interface, a storage apparatus coupled to the processor, and other components.

The network 150 is, for example, what is called a storage area network (SAN). The network 150 can be a network of any type as long as commands, data, and the like can be communicated over the network between the host 140 and the storage system 100.

FIG. 2 is an explanatory diagram of the pair information 116 held in the processor memory 115 of this embodiment.

The pair information 116 contains information about the attributes, state, and the like of each pair 132 that is held by the storage system 100. Specifically, each record of the pair information 116 includes, as information about one of the pairs 132, a pair ID 201, a primary VOL_DEV #202, a secondary VOL_DEV #203, a pair type 204, a copy type 205, a pair state 206, a primary VOL copy BMP #207, a primary VOL update BMP #208, a secondary VOL copy BMP #209, and a secondary VOL update BMP #210.

The pair ID 201 of each pair 132 is identification information of the pair 132. The primary VOL_DEV #202 and secondary VOL_DEV #203 of each pair 132 are respectively identification information of a primary VOL and a secondary VOL that form the pair 132. The pair type 204 of each pair 132 indicates the type of the pair 132. Each pair 132 in this embodiment is of a "normal" type or a "differential" type. In the case of the pair 132 for which "differential" is recorded as the pair type 204, a track of the primary VOL that is updated after the pair is created is stored in an update bitmap (described later) and, when restoration or the like is executed subsequently, copying is executed as instructed by the update bitmap, thereby omitting copying of the yet to be updated track to the secondary VOL. In the case where the pair type 204 is "normal", on the other hand, the updated track is not stored and, when restoration or the like is executed, all tracks need to be copied to the secondary VOL.

A track is a storage area of a given size, and at least one track is included in each logical volume 131 as unit areas for managing whether or not data needs to be copied between one logical volume 131 and another. In other words, whether data needs to be copied or not is determined on a track-by-track basis, as described below. It is not necessary to associate each track with a physical track of HDDs that make up the disk apparatus 130, and a storage area of any size can be defined as a track (i.e., unit area) as long as the storage area is defined in advance.

The copy type 205 of each pair 132 indicates the type of copying (i.e., copy mode) that is executed in the pair 132. The copy type 205 of each pair in this embodiment is one of a "copy mode" and a "no copy mode". Details of the copy types are described later. In the case of the pair 132 for which the "copy mode" is recorded as the copy type 205, data copying from the primary VOL to the secondary VOL for creating the pair (in other words, for storing the same data as the primary VOL in the secondary VOL) is executed for all tracks one by one. In the case where the copy type 205 is the "no copy mode", on the other hand, data copying of a track from the primary VOL to the secondary VOL is executed when a given event occurs, for example, when a command to read the track out of the secondary VOL is received, whereas data copying is not executed for other tracks.

The pair state 206 of each pair 132 indicates the current state of the pair 132, specifically, the progress status of copying for creating the pair 132. The state of each pair 132 in this embodiment is one of "copying", which indicates that copying is in progress, "copy completed", which indicates that copying is finished in its entirety, and "not yet copied", which indicates that copying is not started yet.

The primary VOL copy BMP #207 and the primary VOL update BMP #208 of each pair 132 are respectively identification information of a copy bitmap (copy BMP) and an update bitmap (update BMP) that are allocated to the primary VOL of the pair 132. Similarly, the secondary VOL copy BMP #209 and the secondary VOL update BMP #210 of each pair 132 are respectively identification information of a copy BMP and an update BMP that are allocated to the secondary VOL of the pair 132. The copy BMP and the update BMP allocated to the primary logical volume and the copy BMP and the update BMP allocated to the secondary logical volume are both included in the differential bitmap information 117. In the following description, the copy BMP and the update BMP may collectively be referred to as "differential bitmaps (differential BMPs)".

A copy BMP that is allocated to the primary VOL of one pair 132 indicates the necessity/non-necessity of copying for storing in the secondary VOL the same data that is stored in the primary VOL at the time of creating of the pair 132. An update BMP that is allocated to the primary VOL of the pair 132 whose pair type 204 is "differential" indicates the necessity/non-necessity of copying for storing in the secondary VOL the same data that is stored in the primary VOL at the time of execution of restoration in the pair 132. Details of copying and other processing procedures that are executed to create the pairs 132 (including creating a new pair and restoring an existing pair) are described later.

A copy BMP (and additionally an update BMP when the pair type 204 is "differential") is also allocated to the logical volume 131 that is used as a secondary VOL. The copy BMP (and update BMP) allocated to the secondary VOL is normally not updated nor referred to. When the logical volume 131 that is the secondary VOL newly becomes a primary VOL, the copy BMP (and the update BMP) is updated and referred to as needed.

Figure 3:
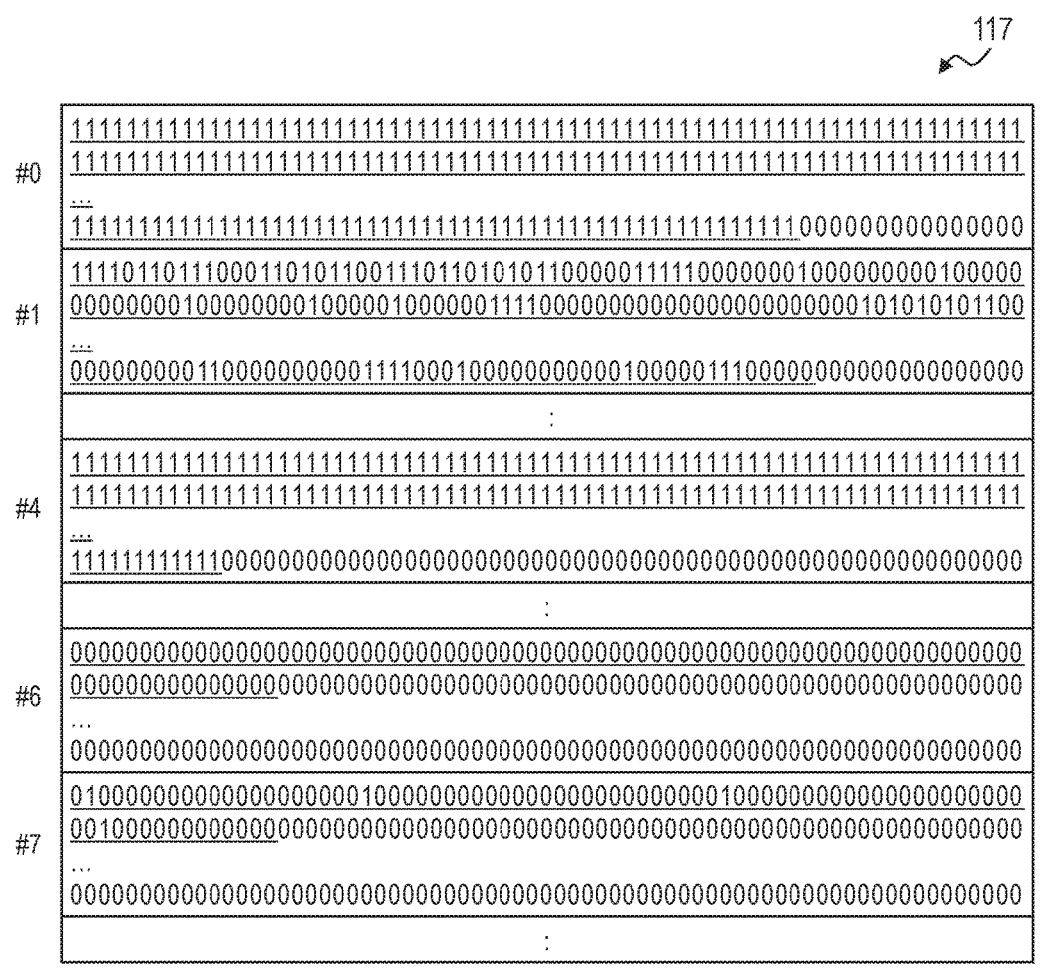

FIG. 3 is an explanatory diagram of the differential bitmap information 117 held in the processor memory 115 of this embodiment.

The differential bitmap information 117 includes a plurality of differential BMPs. Each bit of a differential BMP is associated with a track of one of the logical volumes 131. In the example of FIG. 3, an underlined bit of each differential BMP is allocated to a track of a logical volume. Each differential BMP in the example of FIG. 3 has the same size, and a necessary number of bits determined from a capacity that is defined as the size of each logical volume are therefore allocated to a track.

In the example of FIG. 3, a value "1" of a bit in a copy BMP of the primary VOL of a pair indicates that data that is stored in a track associated with the bit at the time of reception of a request to create the pair is not copied yet to a corresponding track in the pair's secondary VOL. A value "1" of a bit in an update BMP of the primary VOL of a pair indicates that a request to write new data to a track associated with the bit has been received after the reception of a request to create the pair.

Differential BMPs #0 and #1, which are illustrated as an example in FIG. 3, are respectively a copy BMP and an update BMP that are allocated to the primary VOL of the pair 132 that is identified by a value "2" of the pair ID 201 in FIG. 2. This pair 132 has "differential" as the value of the pair type 204, "no copy mode" as the value of the copy type 205, and "not yet copied" as the value of the pair state 206.

In this example, the differential BMP #0 (namely, copy BMP) of FIG. 3 indicates that data in all tracks of the primary VOL needs to be copied to the secondary VOL in order to store in the secondary VOL the same data that is stored in the primary VOL at the time of creating the pair 132 (in other words, the BMP indicates that none of the tracks are copied yet at present). The differential BMP #1 (namely, update BMP) of FIG. 3, on the other hand, points out a track in the primary VOL that has been updated in a period from the creating of the pair 132 to the present, that is, a track in the primary VOL that needs to be copied in order to store, in the secondary VOL, at a future point in time where restoration is executed in the pair 132, the same data that is stored in the primary VOL at that point.

A differential BMP #4 illustrated as an example in FIG. 3 is a copy BMP that is allocated to the primary VOL of the pair 132 that is identified by a value "0" of the pair ID 201 in FIG. 2. The pair type 204 of this pair 132 is "normal", and the primary VOL of this pair 132 is therefore not allocated an update BMP.

Differential BMPs #6 and #7, which are illustrated as an example in FIG. 3, are respectively a copy BMP and an update BMP that are allocated to the primary VOL of the pair 132 that is identified by a value "1" of the pair ID 201 in FIG. 2. This pair 132 has "differential" as the value of the pair type 204, "copy mode" as the value of the copy type 205, and "copy completed" as the value of the pair state 206.

In this example, the differential BMP #6 (namely, copy BMP) of FIG. 3 indicates that data copying from the primary VOL to the secondary VOL for storing in the secondary VOL the same data that is stored in the primary VOL at the time of creating the pair 132 is finished for all tracks.

In the following description, differential BMPs included in the differential bitmap information 117 may be referred to as "differential BMPs 117". The differential BMP 117 that is used as a copy BMP may be referred to as "copy BMP 117". The differential BMP 117 that is used as an update BMP may be referred to as "update BMP 117". For example, a "copy BMP 117A" and an "update BMP 117B" may be used to distinguish one differential BMP 117 from another.

Figures 4, 5:
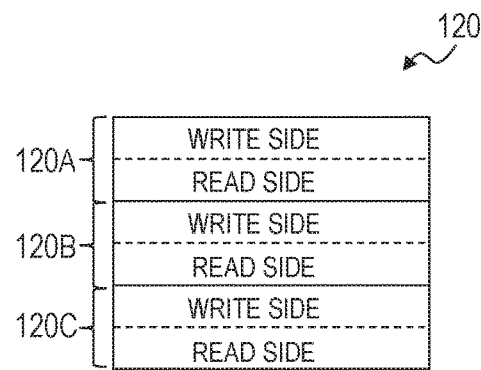
FIG. 4 is an explanatory diagram of slots included in a cache memory of this embodiment.
FIG. 5 is an explanatory diagram of slot management information held in the processor memory of this embodiment.

FIG. 4 is an explanatory diagram of the slots 120 included in the cache memory 119 of this embodiment.

Each slot 120 of the cache memory 119 is associated with any one track in one of the logical volumes 131 as needed. Each slot 120 is made up of a read side where data read out of a track that is associated with the slot is stored and a write side where data written from the host 140 to the track that is associated with the slot is stored. The size of the read side and the size of the write side are each the same as the size of the track. Slots 120A to 120C illustrated in FIG. 4 are an example of the slots 120. The actual cache memory 119, however, can include more slots 120.

FIG. 5 is an explanatory diagram of the slot management information 118 held in the processor memory 115 of this embodiment.

The slot management information 118 contains information about the attributes, state, and the like of the slots 120 included in the cache memory 119. Specifically, each record of the slot management information 118 includes, as information about one of the slots 120, a slot #501, a lock 502, host dirty 503, physical dirty 504, clean 505, and a Copy-After-Write (CAW) attribute 506.

The slot #501 of each slot 120 is identification information of the slot 120. The lock 502 of each slot 120 indicates whether or not the slot 120 is locked. The host dirty 503, physical dirty 504, and clean 505 of each slot 120 indicate which one of a host dirty state, a physical dirty state, and a clean state the slot 120 is in.

The slot 120 that is in a clean state is not allocated to any track, which means that the slot 120 does not store effective data on either the write side or the read side. The slot 120 that is in a physical dirty state is allocated to one of the tracks, stores, on its read side, data read out of the track, and does not have data written from the host 140 yet. The slot 120 in a host dirty state is allocated to one of the tracks, stores, on its read side, data read out of the track, and further stores, on its write side, data written from the host 140. The slot 120 that is in a host dirty state is returned to a clean state by reflecting current data (described later) that is stored in this slot 120 on a track that is associated with the slot 120, and cancelling the allocation of the slot 120 to the associated track.

The CAW attribute 506 of a slot indicates whether or not CAW needs to be executed (i.e., whether or not CAW needs to be executed for the slot at a future point). Details of CAW are described later.

FIG. 6A to FIG. 6D are explanatory diagrams outlining restoration processing that is executed by the storage system 100 of this embodiment.

The storage system 100 first receives from the host 140 a (new) pair creating command. The (new) pair creating command is a type of pair creating command and requests the new formation of a pair, specifically, setting the two logical volumes 131 specified by the command as a primary VOL and a secondary VOL and storing, in the secondary VOL, the same data as the data stored in the primary VOL at present (namely, the time of reception of the command). Now, with reference to FIG. 6A, a description is given as an example of processing that the storage system 100 executes when the received (new) pair creating command specifies the logical volume 131A and the logical volume 131B as a primary VOL and a secondary VOL, respectively, and specifies "differential" and "no copy mode" as the pair type 204 and the copy type 205, respectively.

Figure 6A:
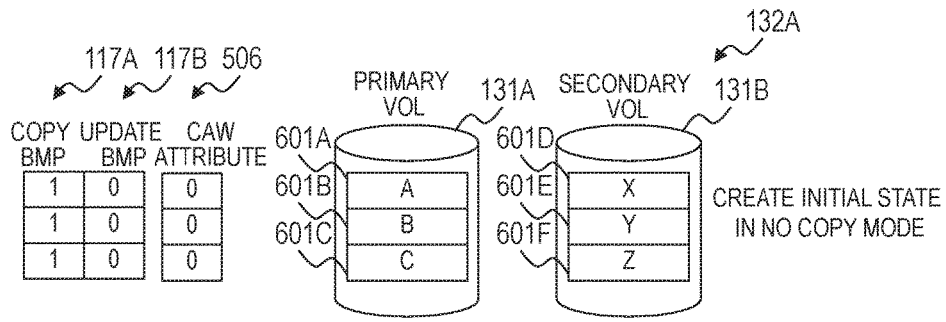
FIG. 6A to FIG. 6D are explanatory diagrams outlining restoration processing that is executed by the storage system of this embodiment.

As illustrated in FIG. 6A, at the time the storage system 100 receives the (new) pair creating command, data "A", data "B", and data "C" are stored in a track 601A, a track 601B, and a track 601C, respectively, in the logical volume 131A, which is the primary VOL (hereinafter also referred to as "primary VOL 131A"), and data "X", data "Y", and data "Z" are stored in a track 601D, a track 601E, and a track 601F, respectively, in the logical volume 131B, which is the secondary VOL (hereinafter also referred to as "secondary VOL 131B"). The pair creating processing module 112 follows the received command to execute processing for making data of the secondary VOL 131B match with data that is in the primary VOL 131A at the time of reception of the command.

Specifically, the copy processing module 113 is required to copy the data "A" to the data "C" from the tracks 601A to 601C of the primary VOL 131A to the tracks 601D to 601F of the secondary VOL 131B, respectively, in order to store in the secondary VOL 131B the same data that is stored in the primary VOL 131A at the time of reception of the command. At the time of FIG. 6A, however, the copying is not executed yet, and the pair creating processing module 112 sets a value "1", which indicates that the copying needs to be executed, to all bits that are associated with the tracks 601A to 601C of the copy BMP 117A.

Bits in the update BMP 117B that are associated with the tracks 601A to 601C are all "0" at this point. While no slots 120 are allocated to the tracks 601A to 601C at this point, the CAW attribute 506 is "0" in all slots 120 that are allocated to the tracks 601A to 601C in the case where the slots 120 are allocated to the tracks 601A to 601C at this point.

Figure 6B:
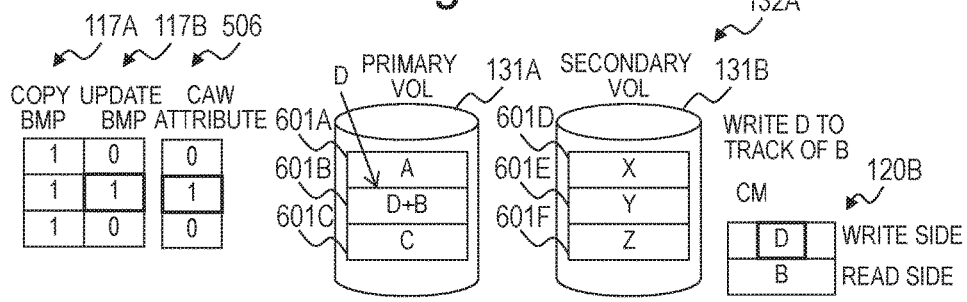

In the case where the storage system 100 subsequently receives from the host 140 a write command for writing the data "D" to the track 601B of the primary VOL 131A, for example, the I/O processing module 114 writes the data "D" to the track 601B (FIG. 6B). Specifically, in the case where no slot 120 of the cache memory 119 is allocated to the track 601B yet, the I/O processing module 114 newly allocates one of the slots 120 (the slot 120B in the example of FIG. 6B) and writes the data "D" to the slot 120B. The slot 120B consequently shifts to a host dirty state. Data written in response to a write command from the host 140 as the data "D" in this example is hereinafter also referred to as write data.

In the following description, data that is in a track of the primary VOL of one pair 132 at the time the pair 132 is created is also referred to as "old data", and data that is in this track at present is also referred to as "current data". For instance, in the case where data is written to a track of the primary VOL 131A after the pair is created as described above, data that was in this track at the time of creating of the pair, before the data writing, is referred to as "old data", and data that is in this track at present as an update by the data writing is referred to as "current data". Current data in a track that has not been updated after the pair is created is the same as old data.

To give a more detailed description, when the slot 120 allocated to a track shifts to a host dirty state as a result of write to the track as described above, data stored on the read side of the allocated slot 120 is "old data" and data stored on the write side of the allocated slot 120 is "current data". However, not every command from the host 140 requests the writing of data that takes up the entirety of a track, and data is written to a part of a track in some cases. In that case, data that is generated by replacing, with write data, data written in an area of the read side that corresponds to an area of the write side where the write data is written (in other words, by merging the read side and the write side) is treated as "current data".

In the example of FIG. 6B, the data "B" read out of the track 601B is written to the entire read side of the slot 120B, and the write data "D" is written to a part of the write side. The data "B" is old data in this case. A part of the data "B" written in an area of the read side that corresponds to an area where the data "D" is written is replaced by the data "D", and this part is treated as current data. Data such as this is hereinafter also referred to as "D+B". However, in the case where the write data "D" fills up the entire write side, current data that is obtained by merging the write side and the read side is ultimately the data "D".

The copy processing module 113 may copy the data "B", which is old data, to the track 601E of the secondary VOL 131B before the I/O processing module 114 writes the write data "D" to the track 601B. Processing of holding off (postponing) the execution of copying old data in a track of the primary VOL to the secondary VOL until new data is written to the track in this manner is called Copy-on-Write (CoW).

In this embodiment, however, the slot 120B has the write side and the read side, and retains the old data "B" on the read side even after the I/O processing module 114 writes the write data "D" to the write side. Therefore, the copy processing module 113 can continue holding off the copying of old data after new data is written to the track 601B. In the example of FIG. 6B, the storage system 100 can be designed so that the copy processing module 113 copies the old data "B" on the read side to the secondary VOL 131B after the I/O processing module 114 writes the write data "D" to the write side and then responds to the write command. This manner of copying is called Copy-After-Write (CAW). A value "1" (may also be expressed as "on") of the CAW attribute 506 in the slot management information 118 indicates that the copying of old data to the secondary VOL is not executed yet although data has been written to a track associated with the slot. In other words, the value "1" indicates that the write data is stored in the write side, and old data on the read side is not copied to the secondary VOL yet despite a discrepancy between current data and old data of the slot, which can also be rephrased as the need to execute CAW at a future point.

Specifically, when the write data "D" is written to the write side, the copy processing module 113 sets the CAW attribute 506 that is associated with the slot 120B to the value "1", which indicates the need for CAW, instead of copying the old data "B" to the secondary VOL 131B. The old data "B" is not yet copied to the secondary VOL 131B at this point, and hence the value of bits of the copy BMP 117A that are associated with the track 601B remain "1", which indicates the need to execute copying. Data of the track 601B is updated by the writing of the write data "D" after the creating of the pair, and hence bits of the update BMP 117B that are associated with the track 601B are set to the value "1", which indicates that data has been updated (in other words, that the current data of the track 601B needs to be copied to the secondary VOL 131B in order to store, in the secondary VOL 131B, at a future point in time where restoration is executed, the same data that is stored in the primary VOL 131A at that point).

The storage system 100 next receives a pair creating (restoring) command from the host 140. The pair creating (restoring) command is a type of pair creating command and requests restoring one of the pairs 132, specifically, storing in the secondary VOL of the existing pair 132 the same data that is in the pair's primary VOL at present (i.e., at the time of reception of the command). Now, with reference to FIG. 6C, a description is given as an example of processing that the storage system 100 executes in the case where the pair creating (restoring) command is received when no old data from any of the tracks 601A to 601C of the primary VOL 131A is copied to the secondary VOL 131B yet and data in the track 601B is updated data (that is, when the current data and the old data of the track 601B differ from each other) as illustrated in FIG. 6B (also referred to as "restoration processing").

Figure 6C:
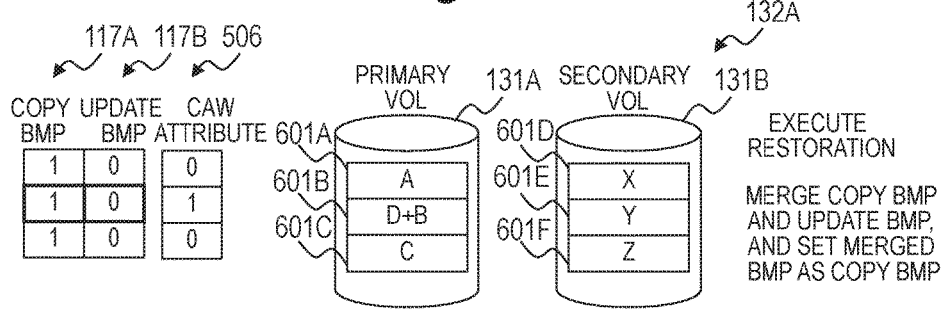
Figure 6D:
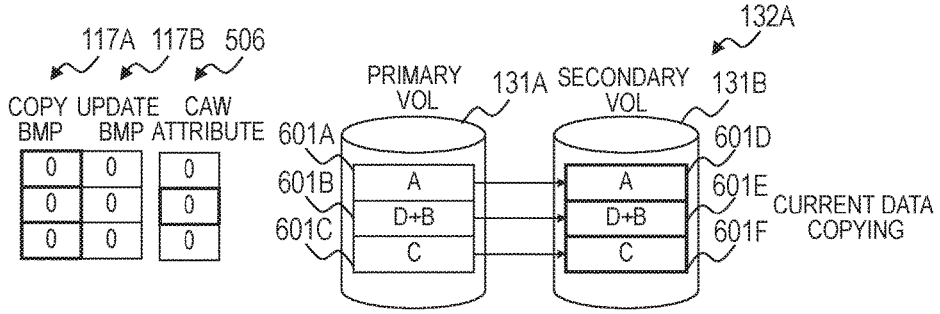
Figure 7A:
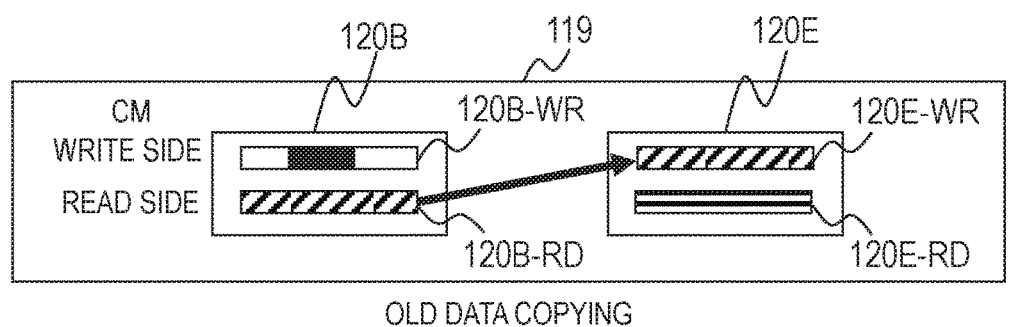
FIG. 7A and FIG. 7B are explanatory diagrams of old data copying and current data copying executed by the storage system of this embodiment.
Figure 7B:
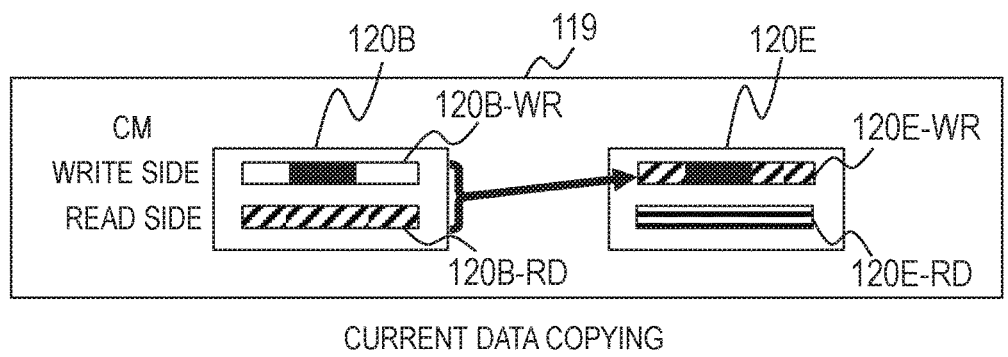

The data "A", which is the current data of the track 601A at the time of reception of the pair creating (restoring) command, is the current data of the track 601A also when the pair 132A has newly been created. In other words, the data "A" is a component of a snapshot of the primary VOL 131A at the time the pair 132A is newly created, and is also a component of a snapshot of the primary VOL 131A at the time the pair 132A is restored. However, the data "A" is not copied to the secondary VOL 131B yet, and bits of the copy BMP 117A that are associated with the track 601A therefore remain "1". The copy processing module 113 copies the current data "A" of the track 601A to the track 601D of the secondary VOL 131B as indicated by this bit value (FIG. 6D, FIG. 7A, and FIG. 7B).

The old data "B" of the track 601B at the time of reception of the pair creating (restoring) command has been a component of a snapshot of the primary VOL 131A obtained when the pair 132A has newly been created. It has therefore been necessary to copy the data "B" to the secondary VOL 131B. However, the restoration of the pair 132A causes the data "B" to no longer be a component of a snapshot of the primary VOL 131A. This means that, in the case where the data "B" is not copied yet to the secondary VOL 131B at the time of the restoration as illustrated in FIG. 6B and FIG. 6C, and then subsequently copied, the data "B" is overwritten by the current data "D+B", which is a component of the original snapshot, and the previously copied data "B" therefore has no chance to be referred to. In such cases, the copying of old data is omitted in this embodiment, to thereby lighten the load of data copying and shorten the processing time. Specifically, the copy processing module 113 copies the current data "D+B" of the track 601B to the track 601E of the secondary VOL 131B as indicated by the bit value of the copy BMP 117A, regardless of the value of the CAW attribute 506 that is associated with the slot 120B (FIG. 6D, FIG. 7A, and FIG. 7B).

While none of the data "A", the data "B", and the data "C" are copied at the time of restoration in the example of FIG. 6A to FIG. 6D, there are cases where the copying of at least one of the data "A" to the data "C" is finished at the time of restoration as described later. In the case where the copying of the data "A" is finished, for example, the current data "A" of the track 601A at the time of restoration is already copied to the secondary VOL 131B and does not need to be copied further. In other words, bits of the copy BMP 117A that are associated with the track 601A are "0", bits of the update BMP 117B are also "0" because the track 601A has not been updated, and the CAW attribute 506 of the slot 120 that is associated with the track 601A is also "0".

When executing the restoration of the pair 132A, the pair creating processing module 112 calculates, for each track, the logical sum of bits of the copy BMP 117A and bits of the update BMP 117B that are associated with the track, sets the calculated logical sum as the new value of the bits of the copy BMP 117A, and sets the bits of the update BMP 117B to "0" as described later. This processing is also referred to as "merging a copy BMP and an update BMP" in the following description. In the example given above, bits of the copy BMP and bits of the update BMP are both "0", and the copy processing module 113 accordingly determines from the merged copy BMP 117A that the copying of the current data "A" does not need to be executed.

In another example, where the copying of the data "B" is finished at the time of restoration, the old data "B" of the track 601B at the time of restoration is already copied to the secondary VOL 131B. Bits of the copy BMP 117A that are associated with the track 601B and the CAW 506 that is associated with the slot 120B are therefore both "0" immediately before restoration. Bits of the update BMP 117B that are associated with the track 601B, on the other hand, are "1" because the track 601B has been updated in a period from the creating of the pair to the restoration. The merge accordingly turns the bits of the copy BMP 117A that are associated with the track 601B into "1", and the current data "D+B" of the track 601B is copied to the secondary VOL 131B.

Processing executed for the track 601C is the same as the one executed for the track 601A, and a description thereof is omitted.

In FIG. 6D, the copying of current data has been finished for all of the tracks 601A to 601C after the restoration illustrated in FIG. 6C. The tracks 601D to 601F of the secondary VOL 131B respectively store "A", "D+B", and "C", which are the current data of the tracks 601A to 601C at the time of restoration. Bits of the copy BMP 117A and bits of the update BMP 117B that are associated with the tracks 601A to 601C are both "0", and the CAW attribute 506 is "0" in each of the slots 120 that have been allocated to the tracks 601A to 601C.

While the execution of restoration processing precedes the copying of old data in every track of the primary VOL 131A in the example of FIG. 6A to FIG. 6D, the copy processing module 113 may execute CAW at a point prior to the execution of restoration processing if necessary. For example, in the case of freeing the slot 120B up (i.e., cancelling the allocation of the slot 120B to the track 601B) in order to increase the free capacity of the cache memory 119, the copy processing module 113 copies old data stored in the slot 120B, namely, the data "B" stored on the read side, to the secondary VOL 131B. To describe in more detail, the copy processing module 113 stores the data "B" on the write side of the slot 120 in the cache memory 119 that is allocated to the track 601E of the secondary VOL, which corresponds to the track 601B (for example, the slot 120E described later). The I/O processing module 114 then stores in the track 601B the current data stored in the slot 120B, namely, the data "D+B", which is generated by merging data on the write side and data on the read side. As a result, the allocation of the slot 120B to the track 601B is cancelled and the slot 120B is made available for allocation to a new track.

When CAW is executed in the manner described above, the CAW attribute 506 that is associated with the slot 120B is updated to a value "0", which indicates that CAW does not need to be executed, and bits of the copy BMP 117A that are associated with the track 601B are updated to a value "0", which indicates that copying does not need to be executed. Bits of the update BMP 117B that are associated with the track 601B, on the other hand, remain "1" because the current data of the track 601B is not copied to the secondary VOL 131B yet.

Data copied from the primary VOL 131A is not stored in the secondary VOL 131B yet at the time illustrated in FIG. 6B. In the case where a read command targeting the secondary VOL 131B is received at this point from the host 140, the storage system 100 executes necessary copying, reads post-copy data, and sends the read data in response.

For example, the track 601A is not updated at the time illustrated in FIG. 6B. In the case where the storage system 100 receives at this point a read command targeting the track 601D of the secondary VOL 131B which corresponds to the track 601A, bits of the copy BMP 117A that are associated with the track 601A are "1", and the copy processing module 113 accordingly copies the old data "A" of the track 601A to the track 601D. Bits of the copy BMP 117A that are associated with the track 601A are updated to "0" as a result. Thereafter, the I/O processing module 114 reads the data "A" out of the track 601D, and sends the read data to the host 140 in response. In the case where the received read command is for the track 601F, the same procedure as the one described above is executed to copy the data "C" from the track 601C to the track 601F, and to send the copy to the host 140 in response.

In another example, when the storage system 100 receives at the time illustrated in FIG. 6B a read command targeting the track 601E of the secondary VOL 131B which corresponds to the track 601B, bits of the copy BMP 117A that are associated with the track 601B are "1", and the copy processing module 113 accordingly copies the old data "B" of the track 601B to the track 601E as illustrated in FIG. 7A and FIG. 7B. Bits of the copy BMP 117A that are associated with the track 601B are updated to "0" as a result. The CAW attribute 506 that is associated with the slot 120B is also updated to "0" because the above-mentioned copying of the old data "B" qualifies as CAW. Thereafter, the I/O processing module 114 reads the data "B" out of the track 601E and sends the read data to the host 140 in response.

After the pair 132A is newly created, the host 140 can thus logically use the secondary VOL 131B as a logical volume that stores the same data that was in the primary VOL 131A at the time of creating the pair 132A (namely, as a snapshot of the primary VOL 131A at that time), even when the same data that was in the primary VOL 131A at the time of creating the pair 132A is not physically stored in the secondary VOL 131B yet.

While the command executed in the example of FIG. 6A is a (new) pair creating command, processing that is executed in the case where the pair 132A has already been created and a pair creating (restoring) command, or a pair creating (FRR) command described later, is executed at the time of FIG. 6A is the same as the one described above.

While the copy type 205 of the pair created in the example of FIG. 6A is "no copy mode", the same processing as the one described above is executed also when a "copy mode" pair is created. Specifically, in the case where a "copy mode" pair is created, the copying of old data is executed for the tracks 601A to 601C in the stated order, and processing executed for tracks that have finished copying old data at the time of restoration and processing executed for tracks that have not finished copying old data at the time of restoration are as described above with reference to FIG. 6B and FIG. 6C.

While the pair type 204 of the pair created in the example of FIG. 6A is "differential", the same processing as the one described above is executed also when a "normal" pair is created. Specifically, in the case where a "normal" pair is created, the update BMP 117B is not associated with the primary VOL 131A. All bits of the copy BMP 117A that are associated with all tracks of the primary VOL 131A are consequently set to "1" at the time restoration is executed (FIG. 6C), irrespective of whether or not the tracks have been updated before that point. Copying that follows the copy BMP 117A is then executed as described above.

FIG. 7A and FIG. 7B are explanatory diagrams of old data copying and current data copying executed by the storage system 100 of this embodiment.

FIG. 7A and FIG. 7B are illustrations of an example of old data copying and current data copying that are executed when the data "B" is stored on a read side 120B-RD of the slot 120B and the data "D" is stored in a part of a write side 120B-WR of the slot 120B. In this example, the slot 120B is allocated to the track 601B of the primary VOL 131A, the slot 120E is allocated to the track 601E of the secondary VOL 131B, and the track 601E corresponds to the track 601B as illustrated in FIG. 6B.

FIG. 7A is an explanatory diagram of old data copying. Old data in this example is the data "B" stored on the read side 120B-RD, and the copy processing module 113 copies the data "B" to a write side 120E-WR of the slot 120E. The data "B" stored on the write side 120E-WR is then stored in the track 601E.

FIG. 7B is an explanatory diagram of current data copying. Current data in this example is the data "D+B", which is formed by merging the data "D" stored on the write side 120B-WR and the data "B" stored on the read side 120B-RD, and hence the copy processing module 113 copies the data "D+B" to the write side 120E-WR of the slot 120E. The data "D+B" stored on the write side 120E-WR is then stored in the track 601E.

Figure 8:
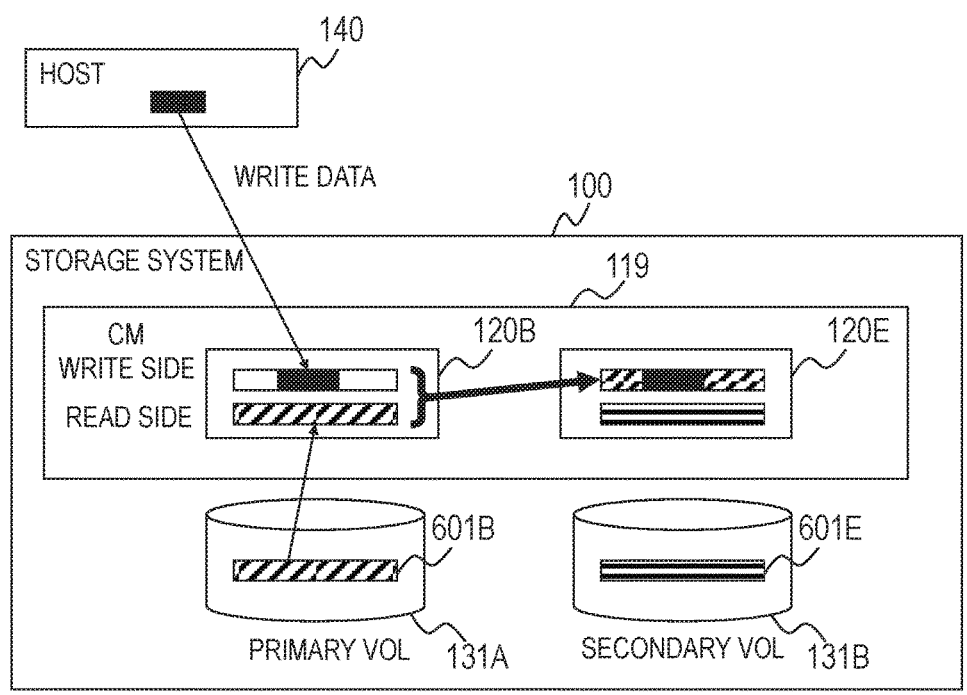
FIG. 8 is an explanatory diagram outlining the procedure of restoration processing that is executed by the storage system of this embodiment.

FIG. 8 is an explanatory diagram outlining the procedure of restoration processing that is executed by the storage system 100 of this embodiment.

In FIG. 8, the track 601B of the primary VOL 131A, the track 601E of the secondary VOL 131B, the slot 120B allocated to the track 601B, and the slot 120E allocated to the track 601E are illustrated as an example, and the procedure of copying data between the slot 120B and the slot 120E is described with reference to the example of FIG. 6A to FIG. 6D.

The data "B" is copied from the track 601B to the read side of the slot 120B, the data "D" is written to the write side of the slot 120B from the host 140 (FIG. 6B), and, when restoration is executed (FIG. 6C), the current data "D+B" stored in the slot 120B is copied to the write side of the slot 120E (FIG. 6D). The data "Y" is copied from the track 601E to the read side of the slot 120E. However, the data "Y" of the track 601E is subsequently overwritten with the data "D+B" of the write side of the slot 120E.

Figure 9:
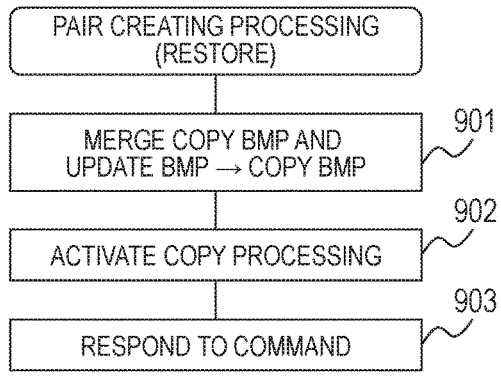
FIG. 9 is a flow chart of processing that is executed by a pair creating processing module of this embodiment when a pair creating (restoring) command is received.

FIG. 9 is a flow chart of processing that is executed by the pair creating processing module 112 of this embodiment when a pair creating (restoring) command is received.

The pair creating processing module 112 receives a pair creating (restoring) command, merges a copy BMP and an update BMP, and keeps the merged BMP as a new copy BMP (Step S901). This processing is as described with reference to FIG. 6C.

The pair creating processing module 112 next activates copy processing (Step S902). Details of the copy processing are described later as illustrated in FIG. 10.

The pair creating processing module 112 next responds to the pair creating (restoring) command (Step S903).

Figure 10:
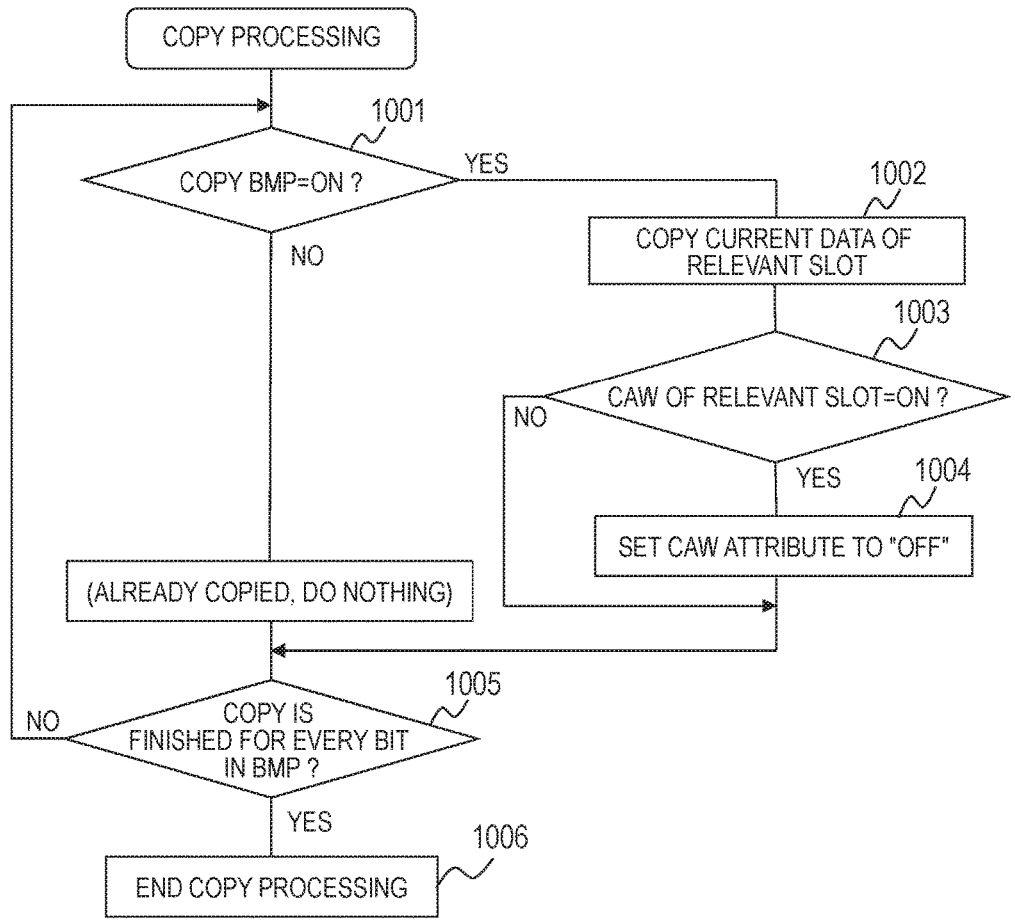
FIG. 10 is a flow chart of the copy processing executed by a copy processing module of this embodiment.

FIG. 10 is a flow chart of the copy processing executed by the copy processing module 113 of this embodiment.

The copy processing illustrated in FIG. 10 is executed when the pair creating processing module 112 executing restoration processing activates the copy processing (Step S902).

The copy processing module 113 first selects a bit at the head of the copy BMP, and determines whether or not the selected bit is "on" ("1" in the examples of FIG. 3, FIG. 6A to FIG. 6D, and other drawings) (Step S1001).

When it is determined in Step S1001 that the selected bit is "on", the copying necessary to take a snapshot of the primary VOL at the time of restoration has not been executed for a track that is associated with the selected bit. The copy processing module 113 therefore copies, to the secondary VOL, the current data of a slot allocated to the track of the primary VOL that is associated with the selected bit (Step S1002). This processing is as described with reference to FIG. 6C and FIG. 6D. Once the copying is finished for the track of the primary VOL, the copy processing module 113 updates the bit of the copy BMP that is associated with this track to "off".

The copy processing module 113 next determines whether or not the CAW attribute 506 of the allocated slot is "on" ("1" in the examples of FIG. 5, FIG. 6A to FIG. 6D, and other drawings) (Step S1003) and, when the CAW attribute 506 is "on", updates the CAW attribute 506 to "off" ("0" in the examples of FIG. 5, FIG. 6A to FIG. 6D, and other drawings) (Step S1004).

The copy processing module 113 next determines whether or not the processing described above is finished for every bit in the copy BMP (Step S1005) and, in the case where not every bit has finished the processing, selects the next bit to return to Step S1001.

When it is determined in Step S1001 that the selected bit is not "on", it means that necessary copying is already finished. The copy processing module 113 therefore skips Steps S1002 to S1004 and executes Step S1005.

When it is determined in Step S1005 that the processing described above has been finished for every bit, the copy processing module 113 ends the copy processing.

The copy processing described above is one that is executed when the restoration of the pair 132 whose copy type 205 is "copy mode" is requested. In the case where the copy type 205 of the pair 132 that is requested to be restored is "no copy mode", the copy processing module 113 executes Steps S1001 to S1004 for a track in which a given event has occurred (for example, a track of the primary VOL that corresponds to a track of the secondary VOL from which data is requested to be read), instead of first selecting a bit at the head of the copy BMP and repeatedly executing Steps S1001 to S1004 until the processing is finished for every bit in Step S1005.

FIG. 11A to FIG. 11D are explanatory diagrams outlining Fast Reverse Restore (FRR) processing in a differential mode that is executed by the storage system 100 of this embodiment.

Figure 11A:
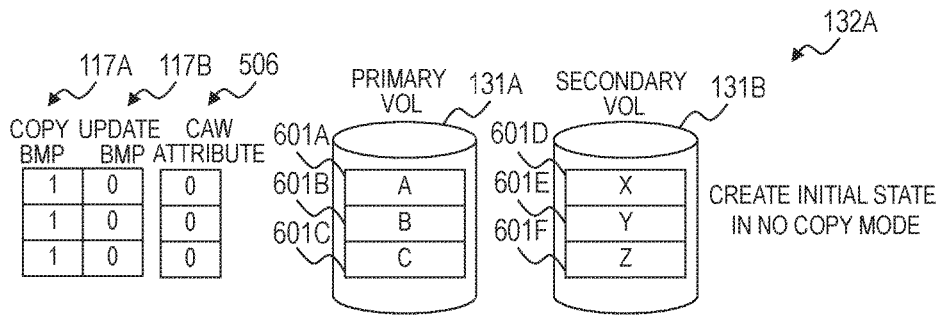
FIG. 11A to FIG. 11D are explanatory diagrams outlining Fast Reverse Restore (FRR) processing in a differential mode that is executed by the storage system of this embodiment.
Figure 11B:
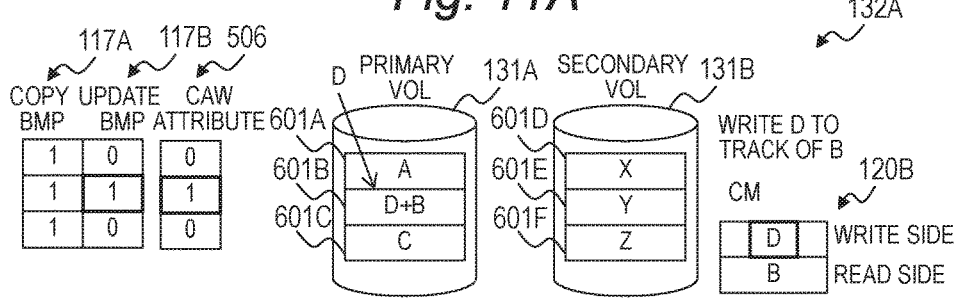

Procedures in FIG. 11A and FIG. 11B are the same as those in FIG. 6A and FIG. 6B, respectively, and descriptions thereof are omitted.

The storage system 100 receives a pair creating (FRR) command from the host 140 after the primary VOL 131A, the secondary VOL 131B, the copy BMP 117A, the update BMP 117B, the slot 120B, and the CAW attribute 506 enter a state illustrated in FIG. 11B. The pair creating (FRR) command is a type of pair creating command and requests FRR of one of the pairs 132. FRR is processing of setting the secondary VOL of the existing pair 132 as a new primary VOL, setting the primary VOL of the existing pair 132 as a new secondary VOL, and storing in the secondary VOL the same data that is in the new primary VOL at present (i.e., at the time of reception of the command). Data of the new primary VOL at present is data logically held by the new primary VOL, namely, a snapshot of the original primary VOL. FRR can therefore be rephrased as processing of restoration for making data of the new secondary VOL match with data that was in the original primary VOL at the last time the pair was created.

Figure 11C:
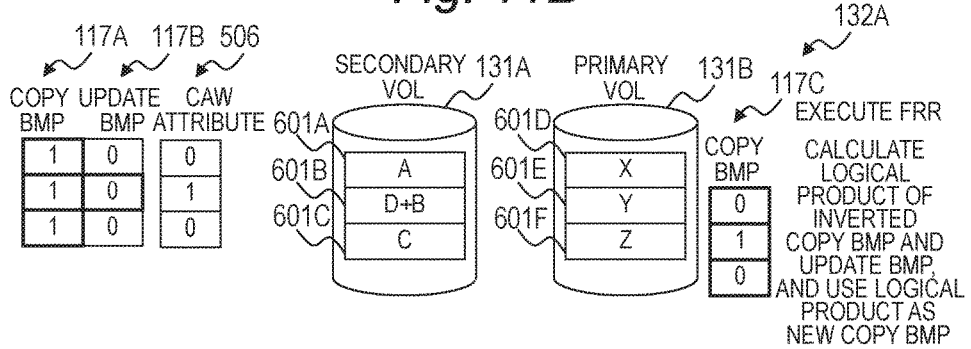

The pair creating processing module 112 receives the pair creating (FRR) command, changes the logical volume 131A from the primary VOL to the secondary VOL, and changes the logical volume 131B from the secondary VOL to the primary VOL. In the following description, the logical volume 131A is also referred to as "old primary VOL 131A" or "new secondary VOL 131A", and the logical volume 131B is also referred to as "old secondary VOL 131B" or "new primary VOL 131B". The pair creating processing module 112 then inverts each bit in the copy BMP 117A of the old primary VOL 131A at the time of reception of the pair creating (FRR) command, calculates the logical product of the inverted copy BMP 117A and the update BMP 117B of the old primary VOL 131A at that time, and keeps the result of the calculation as a copy BMP 117C of the new primary VOL 131B (FIG. 11C).

In practice, the differential BMPs 117 are always allocated to the primary VOL and the secondary VOL both as described with reference to FIG. 2, and copying between the logical volumes 131 is executed based on the differential BMPs 117 of the primary VOL. The differential BMPs 117 illustrated in FIG. 11A to FIG. 11D are ones necessary for the description, and other differential BMPs 117 are omitted from FIG. 11A to FIG. 11D.

Figure 11D:
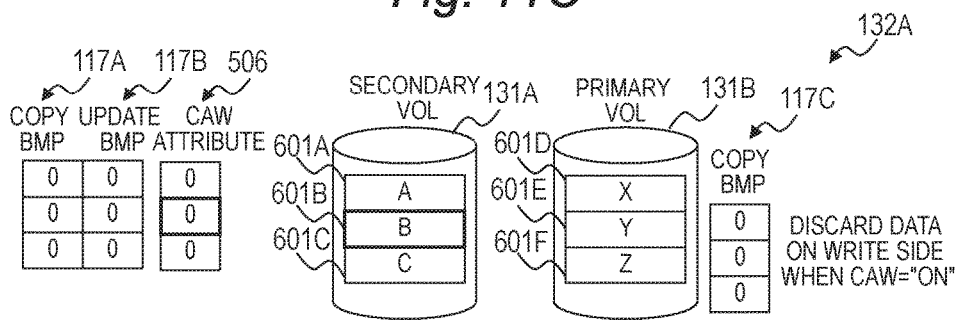

The copy processing module 113 next executes copying of data from the new primary VOL 131B to the new secondary VOL 131A by following the copy BMP 117C, and discards data on the write side of the slot 120 that is allocated to the primary VOL 131A and that has "1" as the value of the CAW attribute 506 (FIG. 11D).

In the example of FIG. 11A to FIG. 11D, all bits of the copy BMP 117A that are associated with the tracks 601A to 601C are "1" and bits of the update BMP 117B that are associated with the track 601B are "0" at the time of reception of the pair creating (FRR) command (FIG. 11B). All bits of the copy BMP 117C that are associated with the tracks 601D to 601F are therefore "0".

In the case where bits of the copy BMP 117A that are associated with one track in the old primary VOL 131A are "0", bits of the update BMP 117B that are associated with the track are "1", and the CAW attribute 506 of the slot 120 that is associated with the track is "0" at the time of FIG. 11B, old data of the track is already copied to a corresponding track in the old secondary VOL 131B, and neither the track nor the slot 120 allocated to the track may retain the old data due to a subsequent update of data in the track. In such tracks, data therefore needs to be copied from the new primary VOL 131B to the new secondary VOL 131A in order to execute FRR.

In the case of a track in the old primary VOL 131A that is associated with bits of the copy BMP 117A that are "1" at the time of FIG. 11B, on the other hand, old data is not copied yet to the old secondary VOL 131B. Old data also remains in a track of the old primary VOL 131A that is associated with bits of the update BMP 117B that are "0". Data copying from the new primary VOL 131B to the new secondary VOL 131A therefore does not need to be executed in either case in order to execute FRR.

However, in the case where the CAW attribute 506 of the slot 120 that is allocated to the one track in the old primary VOL 131A is "1", new data is written on the write side, although old data of the track in the old primary VOL 131A remains on the read side. If no countermeasure is taken, the data on the write side is reflected on the track and the old data is lost. Data is therefore discarded when stored on the write side (i.e., when the CAW attribute 506 is "1").

The copying of old data from the old primary VOL 131A to the old secondary VOL 131B and copying for returning the old data from the new primary VOL 131B to the new secondary VOL 131A are both omitted under given conditions in the manner described above, thereby lightening the load of data copying and shortening the processing time.

For each of the tracks 601D to 601F in the example of FIG. 11A to FIG. 11D, bits of the copy BMP that are associated with the track 601 are "0", and the copying of data from the new primary VOL 131B to the new secondary VOL 131A is therefore not executed. On the other hand, the CAW attribute 506 that is associated with the track 601B of the new secondary VOL 131A is "1", and the data "D" on the write side of the slot 120B allocated to the track 601B is consequently discarded. This prevents the overwriting of the track 601B with the current data "D+B", and ensures that the old data "B" remains.

The FRR processing thus makes the data "A", the data "B", and the data "C" that are stored in the new secondary VOL 131A match with the data "A", the data "B", and the data "C" that have been stored in the old primary VOL 131A at the time of reception of a pair creating command that is the last pair creating command received before the pair creating (FRR) command as illustrated in FIG. 11A.

Data of the old secondary VOL 131B, on the other hand, is logically the same as data of the old primary VOL 131A at the time of FIG. 11A, when the pair 132A is newly created. The old primary VOL 131A and the old secondary VOL 131B, however, do not physically have the same data prior to the execution of the copying of old data from the old primary VOL 131A to the old secondary VOL 131B. Executing the pair creating (FRR) command at this point causes the new primary VOL 131B to store data different from the data of the old primary VOL 131A as illustrated in FIG. 11D. However, this is not a problem because the pair creating (FRR) command is issued on the premise that data of the new primary VOL 131B is not used.

Figure 12:
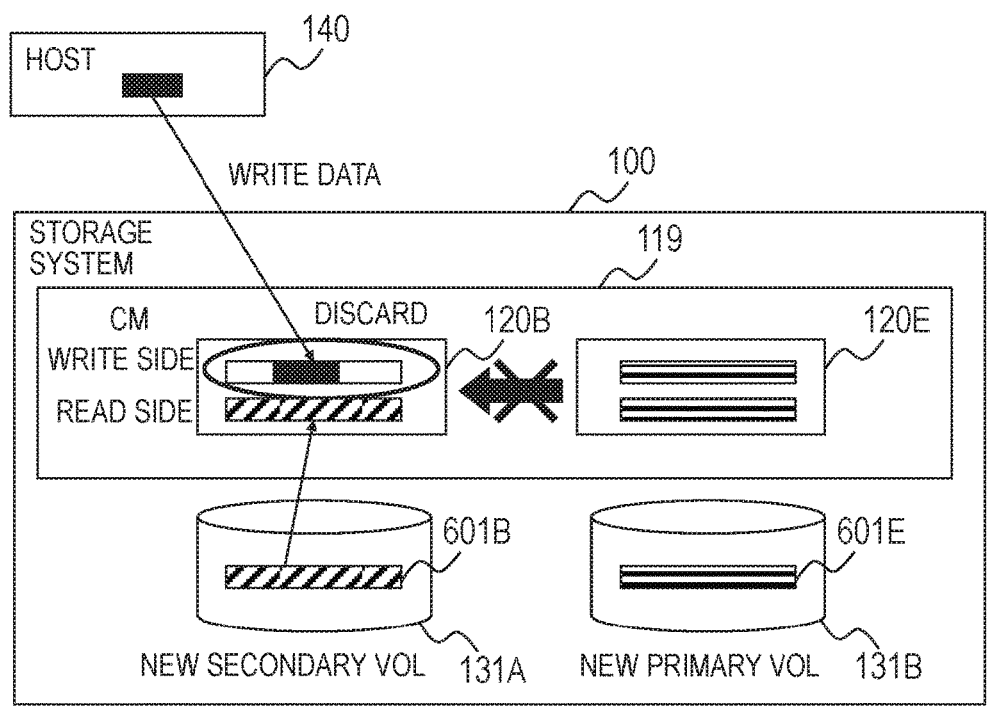
FIG. 12 is an explanatory diagram outlining the procedure of the FRR processing that is executed by the storage system of this embodiment.

FIG. 12 is an explanatory diagram outlining the procedure of the FRR processing that is executed by the storage system 100 of this embodiment.

In FIG. 12, the track 601B of the new secondary VOL 131A, the track 601E of the new primary VOL 131B, the slot 120B allocated to the track 601B, and the slot 120E allocated to the track 601E are illustrated as an example, and the procedure of copying data between the slot 120B and the slot 120E is described with reference to the example of FIG. 11A to FIG. 11D.

The data "B" is copied from the track 601B to the read side of the slot 120B, the data "D" is written to the write side of the slot 120B from the host 140 (FIG. 11B), and, when FRR is executed (FIG. 11C), the data "D" on the write side of the slot 120B is discarded, and copying from the slot 120E to the slot 120B is omitted. The old data "B" remains on the read side of the slot 120E and in the track 601B as a result.

Figure 13:
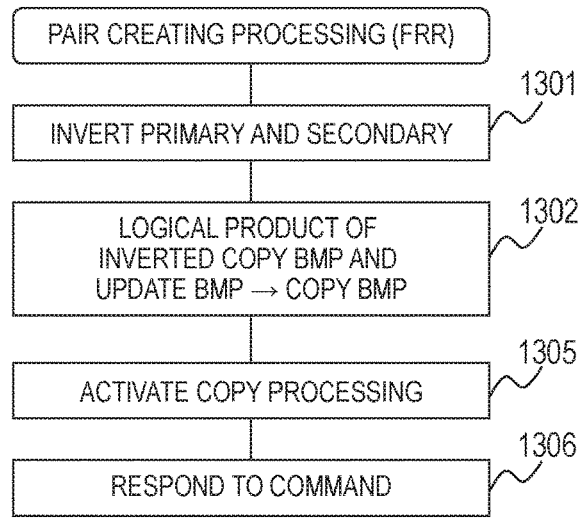
FIG. 13 is a flow chart of processing that is executed by the pair creating processing module of this embodiment when a pair creating (FRR) command for a differential mode pair is received.

FIG. 13 is a flow chart of processing that is executed by the pair creating processing module 112 of this embodiment when the pair creating (FRR) command for a differential mode pair is received.

The pair creating processing module 112 receives the pair creating (FRR) command, and switches the primary VOL and secondary VOL of the target pair 132 by changing the primary VOL to the secondary VOL and changing the secondary VOL to the primary VOL (Step S1301). The pair creating processing module 112 next calculates, for each bit in the copy BMP, an inverted value of the bit, calculates the logical product of the inverted bit and a bit in the update BMP that is associated with the inverted bit, and keeps the values of the calculated logical products as a copy BMP of the new primary VOL (Step S1302). The processing of Steps S1301 and S1302 is as described with reference to FIG. 11C.

The pair creating processing module 112 next activates copy processing (Step S1305). Details of the copy processing are described later with reference to FIG. 14.

The pair creating processing module 112 next responds to the pair creating (FRR) command (Step S1306).

Figure 14:
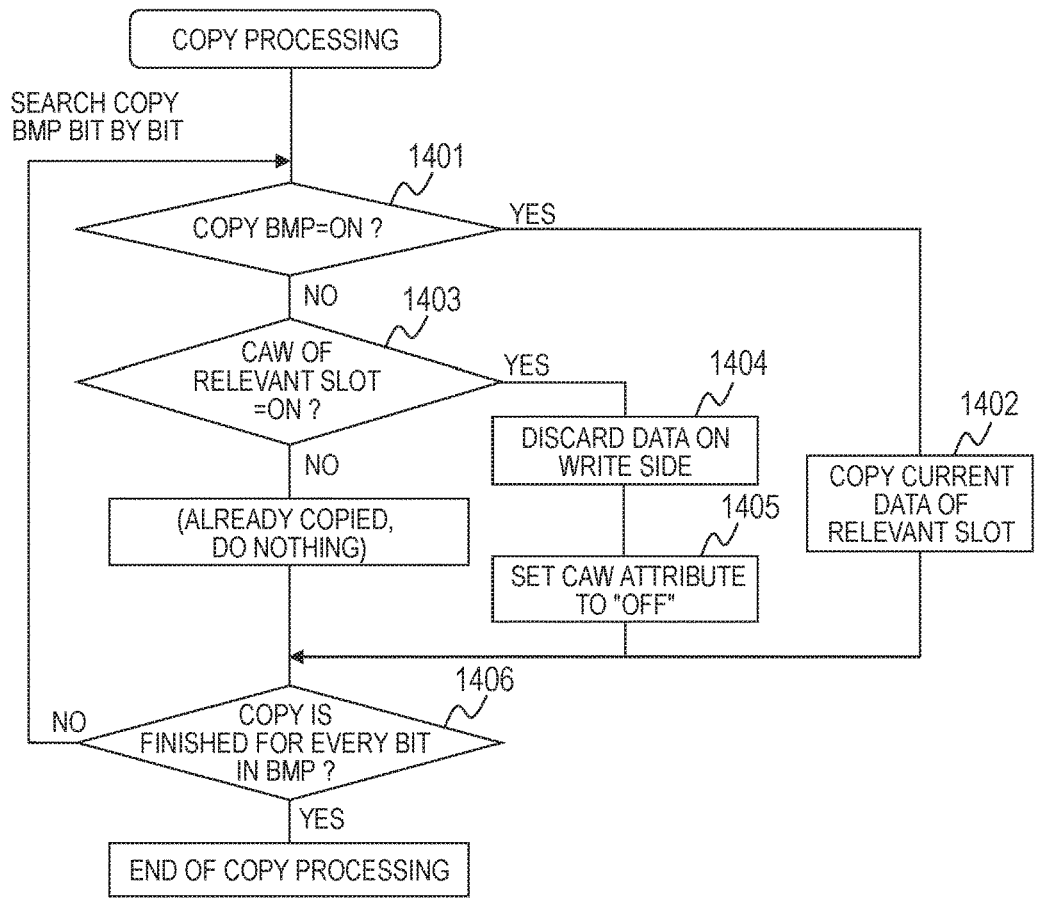
FIG. 14 is a flow chart of the copy processing that is executed by the copy processing module of this embodiment.

FIG. 14 is a flow chart of the copy processing that is executed by the copy processing module 113 of this embodiment.

The copy processing illustrated in FIG. 14 is one that is executed when the pair creating processing module 112 executing the FRR processing activates copy processing (Step S1305).

The copy processing module 113 first selects a bit at the head of the copy BMP of the primary VOL, and determines whether or not the selected bit is "on" (Step S1401). The primary VOL here is a primary VOL at the time of activation of this copy processing, and is the new primary VOL 131B in the example of FIG. 11A to FIG. 11D. Similarly, the secondary VOL in the description of FIG. 14 is the new secondary VOL 131A in the example of FIG. 11A to FIG. 11D.

When it is determined in Step S1401 that the selected bit is "on", the copy processing module 113 copies current data of a track in the primary VOL that is associated with the selected bit to the secondary VOL (Step S1402). Once the copying is finished for the track of the primary VOL, the copy processing module 113 updates the bit of the copy BMP that is associated with this track to "off".

When it is determined in Step S1401 that the selected bit is not "on", on the other hand, the copy processing module 113 searches for a track in the secondary VOL that corresponds to the primary VOL's track associated with the selected bit, and determines whether or not the CAW attribute 506 of the slot 120 that is allocated to the track of the secondary VOL is "on" (Step S1403). When it is determined in Step S1403 that the CAW attribute 506 of this slot 120 is "on", the copy processing module 113 discards data on the write side of the slot 120 (Step S1404) and updates the CAW attribute 506 of the slot 120 to "off" (Step S1405). The processing of Steps S1401 to S1405 is as described with reference to FIG. 11C and FIG. 11D.

When Step S1402 is finished, or when Step S1405 is finished, or when it is determined in Step S1403 that the CAW attribute 506 of the slot 120 is not "on", the copy processing module 113 determines whether or not the processing described above has been finished for every bit in the copy BMP of the primary VOL (Step S1406). In the case where the processing has not finished for every bit, the copy processing module 113 selects the next bit in the copy BMP to return to Step S1401.

When it is determined in Step S1406 that the processing described above has been finished for every bit, the copy processing module 113 ends the copy processing.

The copy processing module 113 may execute Steps S1003 and S1004 of FIG. 10 after executing Step S1402 and before executing Step S1406. In this way, the copy processing that is activated from the restoration processing can be executed as well.

The copy processing described above is one that is executed when FRR is requested for the pair 132 that has "copy mode" as the value of the copy type 205. In the case where FRR is requested for the pair 132 whose copy type 205 is "no copy mode", the copy processing module 113 executes Steps S1401 to S1405 for a track in which a given event has occurred (for example, a track of the new primary VOL that corresponds to a track of the new secondary VOL from which data is requested to be read), instead of first selecting a bit at the head of the copy BMP and repeatedly executing Steps S1401 to S1405 until the processing is finished for every bit in Step S1406.

FIG. 15A to FIG. 15D are explanatory diagrams outlining FRR processing in a normal mode that is executed by the storage system 100 of this embodiment.

Figure 15A:
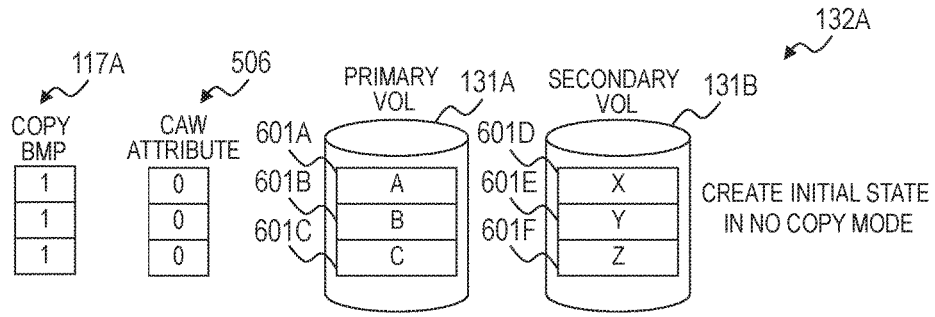
FIG. 15A to FIG. 15D are explanatory diagrams outlining FRR processing in a normal mode that is executed by the storage system of this embodiment.
Figure 15B:
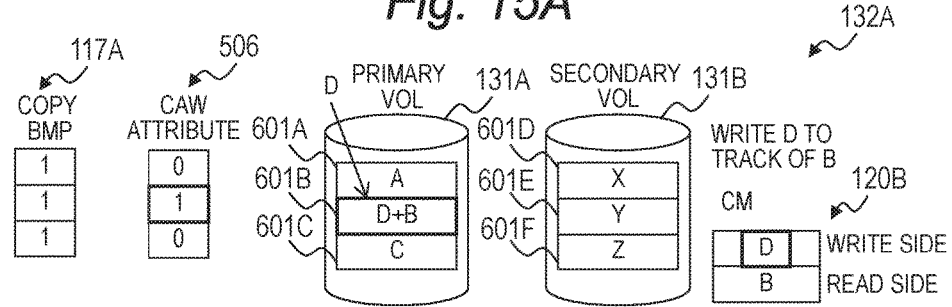

Procedures in FIG. 15A and FIG. 15B are the same as those in FIG. 11A and FIG. 11B, respectively, except that the pair type 204 of the created pair 132A is "normal". In this case, the update BMP 117B is not allocated to the primary VOL 131A, and a track updated after the pair is created is therefore not recorded.

The storage system 100 receives a pair creating (FRR) command from the host 140 after the primary VOL 131A, the secondary VOL 131B, the copy BMP 117A, the slot 120B, and the CAW attribute 506 enter a state illustrated in FIG. 15B.

Figure 15C:
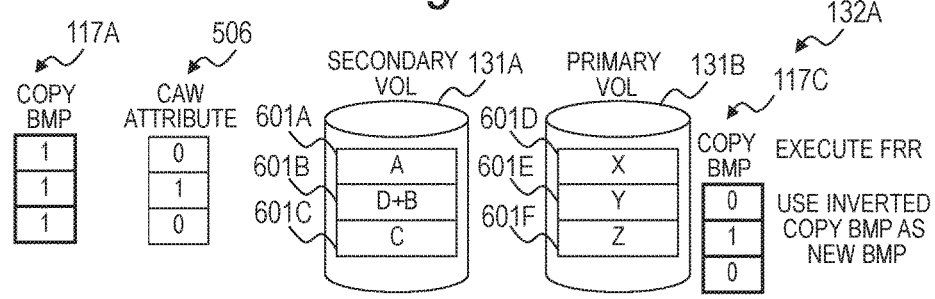

The pair creating processing module 112 receives the pair creating (FRR) command, changes the logical volume 131A from the primary VOL to the secondary VOL, and changes the logical volume 131B from the secondary VOL to the primary VOL. The pair creating processing module 112 then inverts each bit in the copy BMP 117A of the old primary VOL 131A at the time of reception of the pair creating (FRR) command, and holds the inverted BMP as the copy BMP 117C of the new primary VOL 131B (FIG. 15C).

Figure 15D:
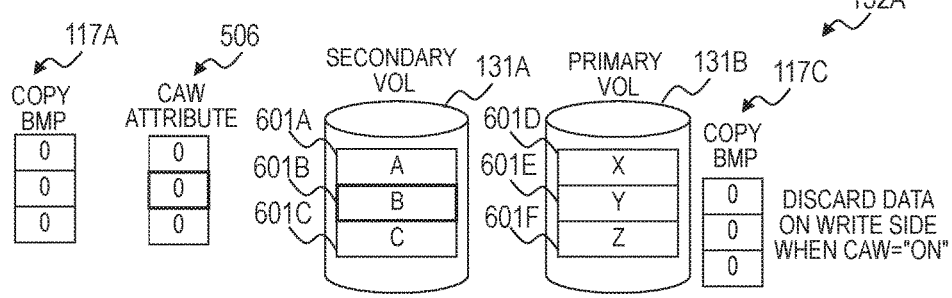

Next, the copy processing module 113 executes the copying of data from the new primary VOL 131B to the new secondary VOL 131A by following the copy BMP 117C, and discards data on the write side of the slot 120 that is allocated to the primary VOL 131A and that has "1" as the value of the CAW attribute 506 (FIG. 15D).

In the example of FIG. 15A to FIG. 15D, all bits of the copy BMP 117A that are associated with the tracks 601A to 601C are "1" at the time the pair creating (FRR) command is received (FIG. 15B). All bits of the copy BMP 117C that are associated with the tracks 601D to 601F are accordingly "0".

In the case where bits of the copy BMP 117A that are associated with one track in the old primary VOL 131A are "0" and the CAW attribute 506 of the slot 120 that is allocated to the track is "0" at the time of FIG. 15B, old data of the track is already copied to a corresponding track in the old secondary VOL 131B. Whether or not data of the track is updated afterwards cannot be found out with no update BMP allocated in this example. This leaves a possibility that the track is already updated, thereby leaving the old data in neither the track nor the slot 120 allocated to the track. In such tracks, data therefore needs to be copied from the new primary VOL 131B to the new secondary VOL 131A in order to execute FRR.

In the case of a track in the old primary VOL 131A that is associated with bits of the copy BMP 117A that are "1" at the time of FIG. 15B, on the other hand, old data is not copied yet to the old secondary VOL 131B. Data therefore does not need to be copied from the new primary VOL 131B to the new secondary VOL 131A in order to execute FRR in this case.

However, in the case where the CAW attribute 506 of the slot 120 that is allocated to the one track in the old primary VOL 131A is "1", data is also written on the write side, although the old data of the track in the old primary VOL 131A remains on the read side. If no countermeasure is taken, the data on the write side is reflected on the track and the old data is lost. Data is therefore discarded when stored on the write side (i.e., when the CAW attribute 506 is "1").

The copying of old data from the old primary VOL 131A to the old secondary VOL 131B and copying for returning the old data from the new primary VOL 131B to the new secondary VOL 131A are both omitted under given conditions in the manner described above, thereby lightening the load of data copying and shortening the processing time.

For each of the tracks 601D to 601F in the example of FIG. 15A to FIG. 15D, bits of the copy BMP that are associated with the tracks 601 are "0", and the copying of data from the new primary VOL 131B to the new secondary VOL 131A is therefore not executed. On the other hand, the CAW attribute 506 that is associated with the track 601B of the new secondary VOL 131A is "1", and the data "D" on the write side of the slot 120B allocated to the track 601B is consequently discarded. This prevents the overwriting of the track 601B with the current data "D+B", and ensures that the old data "B" remains.

Thus, as a result of the FRR processing, the data "A", the data "B", and the data "C" that are stored in the new secondary VOL 131A match with the data "A", the data "B", and the data "C" that are stored in the old primary VOL 131A at the time of reception of a pair creating command that is the last pair creating command received before the pair creating (FRR) command as illustrated in FIG. 15A.

The data copy procedure in the FRR processing of the normal mode is the same as the procedure in the FRR processing of the differential mode as illustrated in FIG. 12, and therefore a description thereof is omitted.

Figure 16:
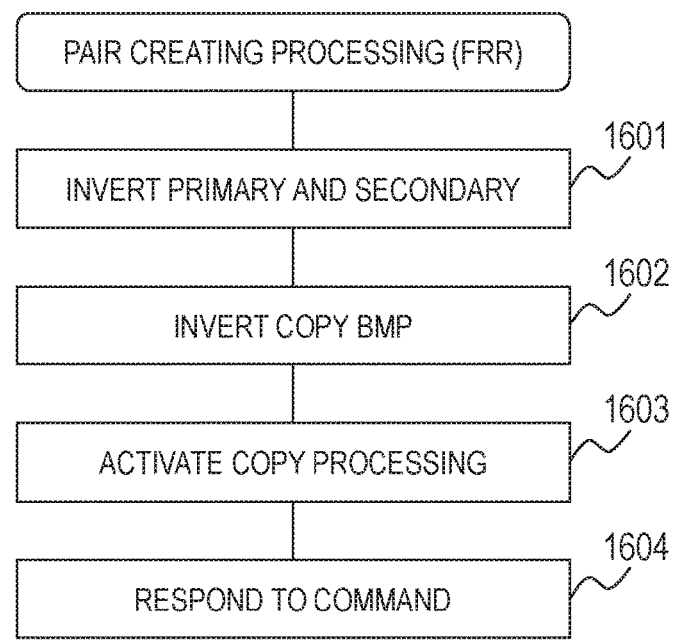
FIG. 16 is a flow chart of processing that is executed by the pair creating processing module of this embodiment when a pair creating (FRR) command for a normal mode pair is received.

FIG. 16 is a flow chart of processing that is executed by the pair creating processing module 112 of this embodiment when a pair creating (FRR) command for a normal mode pair is received.

The pair creating processing module 112 receives the pair creating (FRR) command, and switches the primary VOL and the secondary VOL of the target pair 132 by changing the primary VOL to the secondary VOL and changing the secondary VOL to the primary VOL (Step S1601). The pair creating processing module 112 next inverts each bit in the copy BMP, and holds the inverted BMP as a copy BMP of the new primary VOL (Step S1602).

The pair creating processing module 112 next activates copy processing (Step S1603). The copy processing activated here is the same as the copy processing that is activated in the FRR processing of the differential mode as illustrated in FIG. 14, and therefore a description thereof is omitted.

The pair creating processing module 112 next responds to the pair creating (FRR) command (Step S1604).

Figure 17:
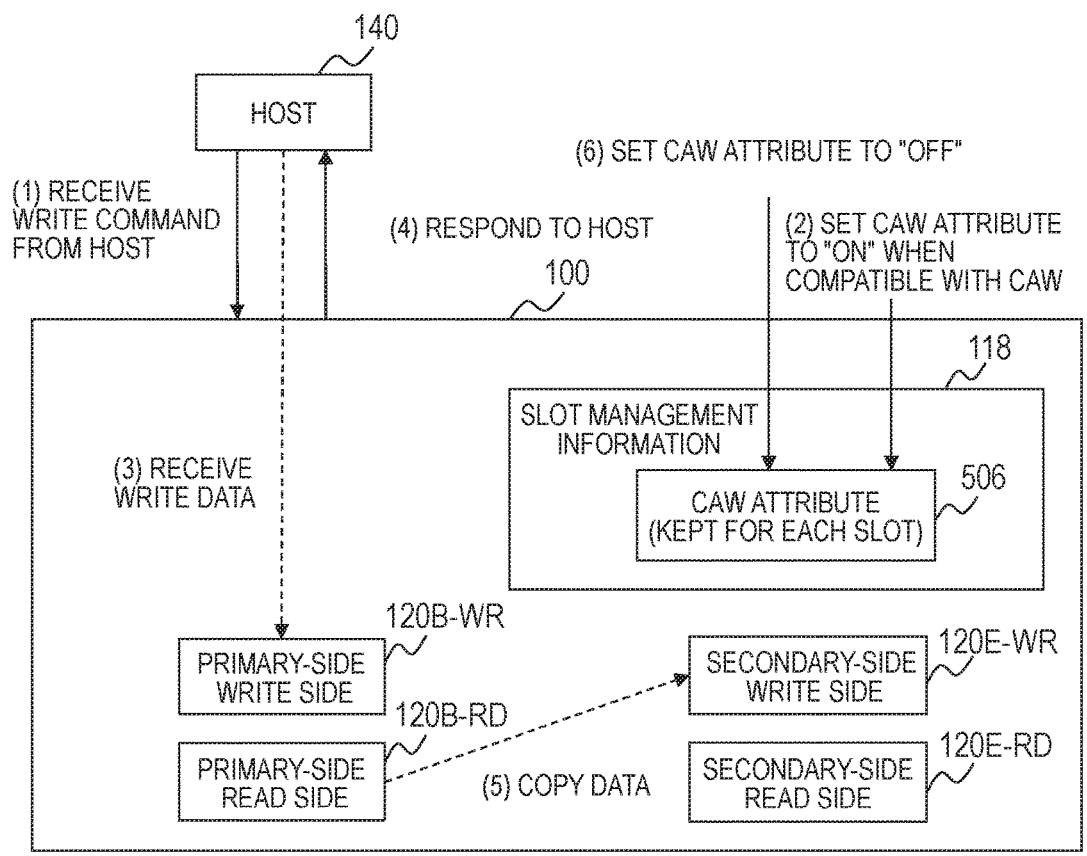
FIG. 17 is an explanatory diagram of write processing that is executed by an I/O processing module of this embodiment when a write command is received.
Figure 18:
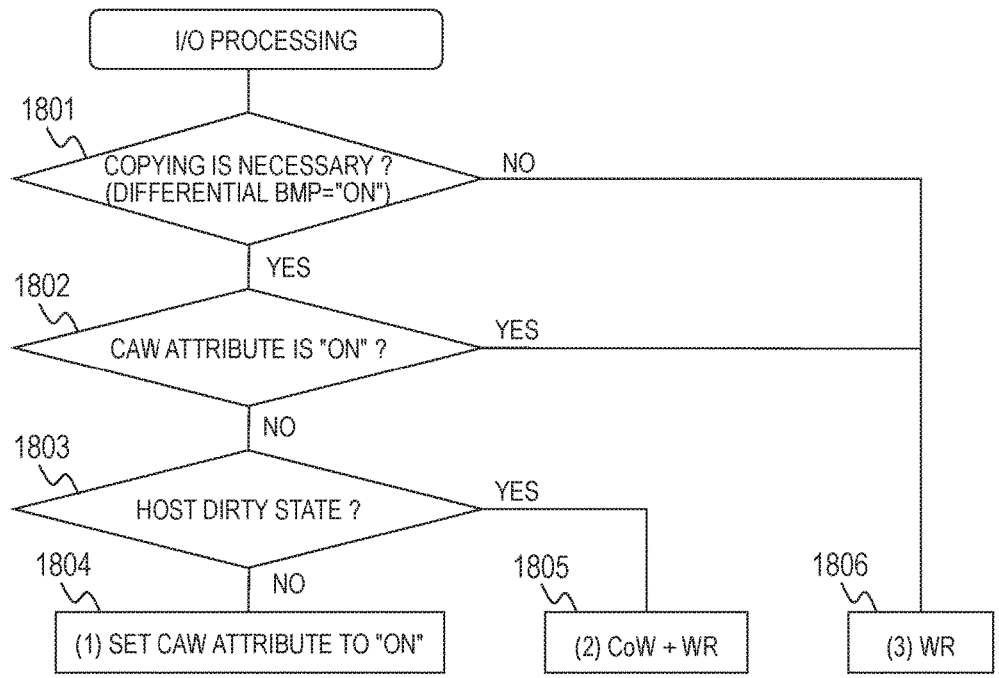
FIG. 18 is a flow chart of write processing that is executed by the I/O processing module of this embodiment.
Figure 19:
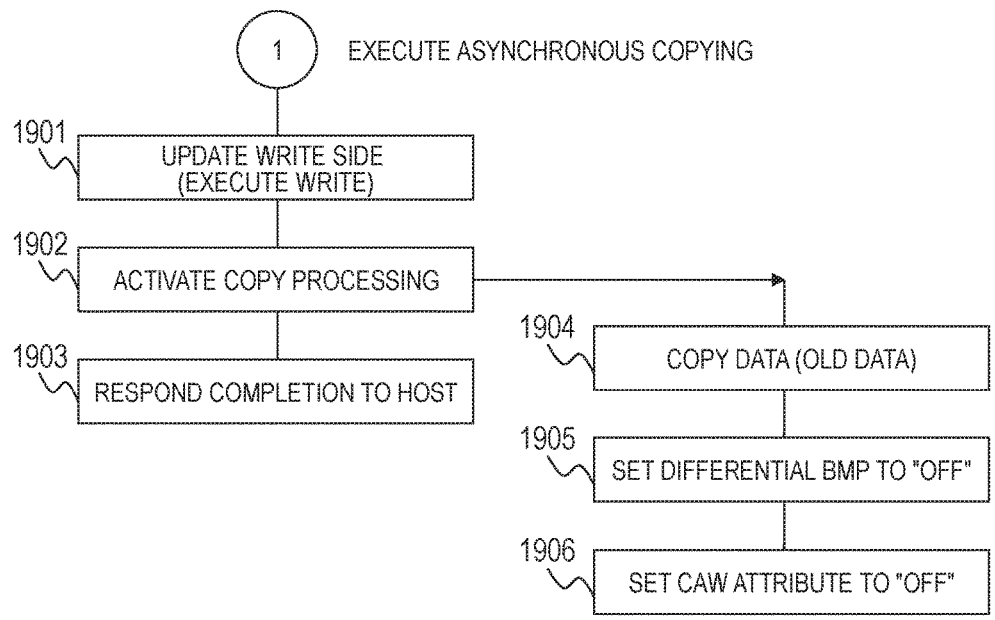
FIG. 19 is a flow chart of write processing that is executed by the I/O processing module of this embodiment.
Figure 20:
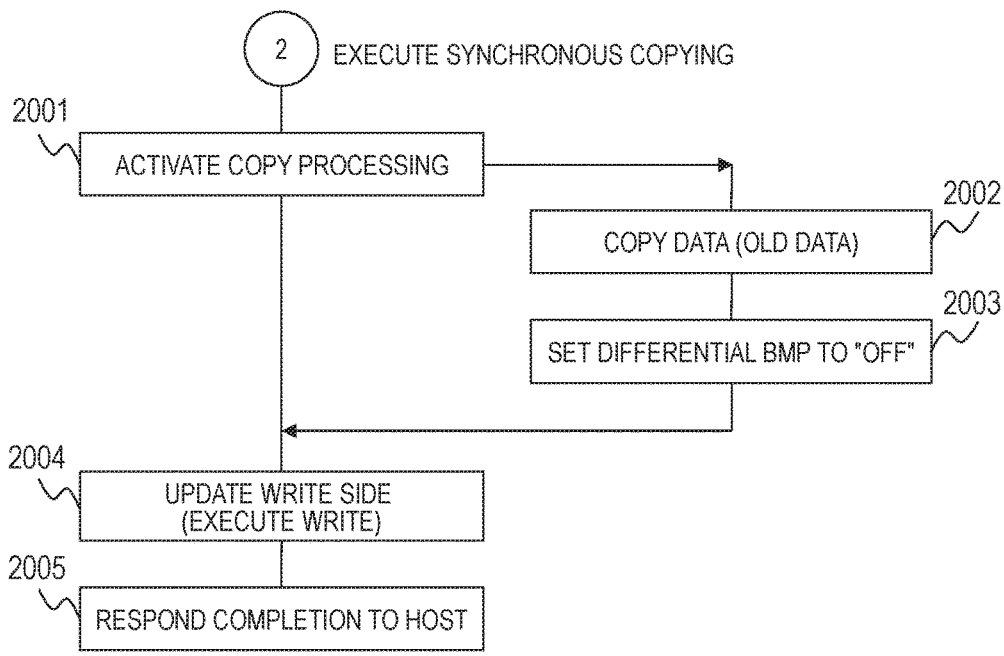
FIG. 20 is a flow chart of write processing that is executed by the I/O processing module of this embodiment.
Figure 21:
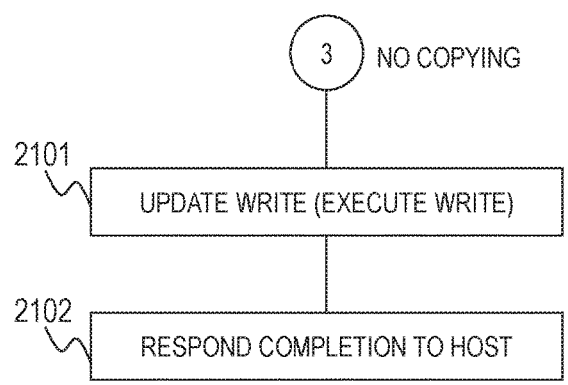
FIG. 21 is a flow chart of write processing that is executed by the I/O processing module of this embodiment.

FIG. 17 is an explanatory diagram of I/O processing that is executed by the I/O processing module 114 of this embodiment when a write command is received (hereinafter may simply be referred to as "write processing").

When the storage system 100 receives a write command from the host 140 (1), and the relevant volumes are compatible with CAW, the I/O processing module 114 first searches the slot management information 118 for a record of the slot 120B (namely, a primary-side slot) allocated to a track in which data specified by the command is to be written (a write target track), and sets the CAW attribute 506 in this record to "on" (that is, sets the CAW attribute 506 to "1"). The I/O processing module 114 next receives write data, writes the received data to the write side 120B-WR of a slot that is allocated to the write target track (3), and responds to the host 140 (4).

Thereafter, the copy processing module 113 copies data on the read side 120B-RD of the primary-side slot to the write side 120E-WR of a secondary-side slot (5), and sets the CAW attribute 506 that is associated with the primary-side slot 120B to "off" (that is, sets the CAW attribute 506 to "0").

FIG. 18 to FIG. 21 are flow charts of write processing that is executed by the I/O processing module 114 of this embodiment.

The I/O processing module 114 receives a write command from the host 140 and determines whether or not copying is necessary (Step S1801). Specifically, the I/O processing module 114 determines that copying is necessary when bits of a copy BMP that are associated with a write target track specified by the write command are "on".

When it is determined in Step S1801 that copying is necessary, the I/O processing module 114 determines whether or not the CAW attribute 506 of the slot 120 that is allocated to the write target track is "on" (Step S1802).

When it is determined in Step S1802 that the CAW attribute 506 is not "on", the I/O processing module 114 determines whether or not the slot 120 allocated to the write target track is in a host dirty state (Step S1803).

When it is determined in Step S1803 that the slot 120 is not in a host dirty state, CAW is executed. Specifically, CAW is executed when the slot 120 is in a clean state, where data is stored on neither the write side nor the read side. CAW is executed also when the slot 120 is in a physical dirty state, where data is stored not on the write side and only on the read side, and data to be copied is old data stored on the read side.

The I/O processing module 114 accordingly sets the CAW attribute 506 of this slot 120 to "on" (Step S1804), writes the write data to the write side of the slot 120 (Step S1901), and activates copy processing (Step S1902). The I/O processing module 114 then responds to the host that the write processing has been completed, irrespective of whether the copying is finished or not (Step S1903).

The copy processing module 113 activated in Step S1902 executes the copying of the old data (Step S1904), sets bits of the copy BMP that are associated with the write target track to "off" (Step S1905), and sets the CAW attribute 506 of the slot 120 that is allocated to the track to "off" (Step S1906). Steps S1904 to S1906, however, are omitted in the case where the next pair creating (restoring) command is received while the execution of Steps S1904 to S1906 is held off, as described with reference to FIG. 6A to FIG. 10.

When it is determined in Step S1803 that the slot 120 is in a host dirty state, data to be copied from the primary VOL is current data. Because the current data is not copied yet, the current data to be copied is lost if new data is further written to the write side. This is prevented by executing processing of writing new data to the write side after the current data is copied (namely, CoW). The I/O processing module 114 activates copy processing for that reason (Step S2001). The activated copy processing module 113 executes the old data copying (Step S2002), and sets the bits of the copy BMP that are associated with the write target track to "off" (Step S2003).

When Step S2003 is finished, the I/O processing module 114 writes the write data to the write side of the slot 120 that is associated with the write target track (Step S2004), and responds to the host that the write processing has been completed (Step S2005).

When it is determined in Step S1802 that the CAW attribute 506 is "on", data to be copied from the primary VOL is old data stored on the read side and hence, even if there is data already stored on the write side, the existing data on the write side is not data to be copied and can be overwritten without causing problems. Write processing that does not involve data copying is therefore executed. Specifically, the I/O processing module 114 writes the write data to the write side of the slot 120 that is associated with the write target track (Step S2101), and responds to the host that the write processing has been completed (Step S2102).

Write processing that does not involve data copying is executed (Steps S2101 and S2102) also when it is determined in Step S1801 that copying is not necessary.

According to this embodiment, the lightening of the processing load on a storage system and the shortening of the processing time can thus be accomplished by holding off copying old data from the primary VOL of a pair to the secondary VOL of the pair after the pair is created, and omitting the held-off copying of the old data in the case where the next pair creating (restoration or FRR) is executed while the copying of the old data is held off. Thereafter, necessary processing, for example, the copying of current data in the case of restoration, and the copying of current data or the discarding of data on the write side in the case of FRR, is executed, thereby achieving desired pair creating processing.

This invention is not limited to the embodiment described above, and encompasses various modification examples. For example, the embodiment has described this invention in detail for the ease of understanding, and this invention is not necessarily limited to a mode that includes all of the configurations described above.

The components, functions, processing modules, processing means, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions may be stored in a computer-readable non-transitory data storage medium, for example, memory, or a hard disk drive, a solid state drive (SSD), or other storage device, or an IC card, an SD card, a DVD, or the like.

Control lines and information lines considered to be necessary for describing the embodiments are illustrated in the drawings, and all control lines and information lines included in an actual product to which this invention is applied are not always illustrated. It may also be considered that almost all components are actually mutually coupled to each other.

What is claimed is:

1. A storage system, comprising a processor, a processor memory, a cache memory, and a storage apparatus, the storage system being coupled to a host computer in a manner that allows communication between the storage system and the host computer,
wherein the storage apparatus has a storage area comprising a first logical volume and a second logical volume, and
wherein the processor is configured to:
receive a first pair creating request at a first point in time for storing data of the first logical volume at the first point in time in the second logical volume;
receive a write request to the first logical volume after the first point in time;
store, in the cache memory, new data of the write request, the new data of the write request to be written over old data$_{[SM1]}$ related to the write request;
receive a second pair creating request at a second point in time for storing data in one of the first logical volume and the second logical volume at the second point in time in another one of the first logical volume and the second logical volume; and
omit copying, to the second logical volume, the old data, related to the write request, that is in the first logical volume at the first point in time if the old data is stored in the cache memory and is not copied to the second logical volume yet at the second point in time and the write request is received before the second point in time$_{[SM2]}$.

2. The storage system according to claim 1,
wherein the first logical volume has a storage area comprising a unit area storing the old data, the second logical volume has a storage area comprising a unit area, and the unit area of the first logical volume and the unit area of the second logical volume correspond to each other,
wherein a storage area of the cache memory comprises a first side and a second side, which are associated with each other, and
wherein the processor is configured to:
store the new data, when the write request to write the new data in the unit area of the first logical volume is received after the reception of the first pair creating request and before the old data that is in the unit area of the first logical volume at the time of reception of the first pair creating request is copied to the second logical volume, in the second side that is associated with the first side where the old data that is in the unit area of the first logical volume at the time of reception of the first pair creating request is stored; and
copy, to the second logical volume, present data in the unit area of the first logical volume that is generated by combining the old data stored on the first side and the new data stored on the second side, instead of copying the old data stored on the first side to the second logical volume, when the new data is stored on the second side and the old data on the first side is not copied to the second logical volume yet at a time of reception of a second pair creating request for storing, in the second logical volume, the same data that is stored at present in the first logical volume.

3. The storage system according to claim 2,
wherein the processor memory is configured to hold copy information and update information, the copy information indicating whether or not the old data that is in the unit area of the first logical volume at the time of reception of the first pair creating request has been copied to the second logical volume, the update information indicating whether or not the write request to write the new data to the unit area of the first logical volume has been received after the reception of the first pair creating request, and
wherein the processor is configured to:
avoid copying the old data stored on the first side to the second logical volume when it is determined, based on the copy information and the update information, that the old data in the unit area of the first logical volume is already copied to the second logical volume and the request to write the new data to the unit area of the first logical volume is not received yet at the time of reception of the second pair creating request;

copy the old data stored on the first side to the second logical volume when it is determined, based on the copy information and the update information, that the old data in the unit area of the first logical volume is not copied to the second logical volume yet and the write request to write the new data to the unit area of the first logical volume is not received yet at the time of reception of the second pair creating request;

copy, to the second logical volume, present data in the unit area of the first logical volume that is generated by combining the old data stored on the first side and the new data stored on the second side, when it is determined, based on the copy information and the update information, that the old data in the unit area of the first logical volume is already copied to the second logical volume and the write request to write the new data to the unit area of the first logical volume is already received at the time of reception of the second pair creating request; and copy, to the second logical volume, present data in the unit area of the first logical volume that is generated by combining the old data stored on the first side and the new data stored on the second side, instead of copying the old data stored on the first side to the second logical volume, when it is determined, based on the copy information and the update information, that the old data in the unit area of the first logical volume is not copied to the second logical volume yet and the write request to write the new data to the unit area of the first logical volume is already received at the time of reception of the second pair creating request.

4. The storage system according to claim 1, wherein the first logical volume has a storage area comprising a unit area storing the old data, the second logical volume has a storage area comprising a unit area, and the unit area of the first logical volume and the unit area of the second logical volume correspond to each other, wherein a storage area of the cache memory comprises a first side and a second side, which are associated with each other, and wherein the processor is configured to:
  store the new data, when the write request to write the new data in the unit area of the first logical volume is received after the reception of the first pair creating request and before the old data that is in the unit area of the first logical volume at the time of reception of the first pair creating request is copied to the second logical volume, in the second side that is associated with the first side where the old data that is in the unit area of the first logical volume at the time of reception of the first pair creating request is stored; and
  discard the new data stored on the second side, instead of copying the old data stored on the first side to the second logical volume, when the new data is stored on the second side and the old data on the first side is not copied to the second logical volume yet at a time of reception of a second pair creating request for storing, in the first logical volume, the same data that is in the second logical volume at present.

5. The storage system according to claim 4, wherein the processor memory is configured to hold copy information, which indicates whether or not the old data that is in the unit area of the first logical volume at the time of reception of the first pair creating request has been copied to the second logical volume, and wherein the processor is configured to:
  copy, to the first logical volume, data in the unit area of the second logical volume that corresponds to the unit area of the first logical volume when it is determined, based on the copy information, that the old data in the unit area of the first logical volume is already copied to the second logical volume at the time of reception of the second pair creating request;
  avoid copying, to the first logical volume, data in the unit area of the second logical volume that corresponds to the unit area of the first logical volume when it is determined, based on the copy information, that the old data in the unit area of the first logical volume is not copied to the second logical volume yet at the time of reception of the second pair creating request; and
  discard the new data stored on the second side when it is determined, based on the copy information, that the old data in the unit area of the first logical volume is not copied to the second logical volume yet at the time of reception of the second pair creating request, and when the new data is stored on the second side.

6. The storage system according to claim 4, wherein the processor memory is configured to hold copy information and update information, the copy information indicating whether or not the old data that is in the unit area of the first logical volume at the time of reception of the first pair creating request has been copied to the second logical volume, the update information indicating whether or not the write request to write the new data to the unit area of the first logical volume has been received after the reception of the first pair creating request, and wherein the processor is configured to:
  copy, to the first logical volume, data in the unit area of the second logical volume that corresponds to the unit area of the first logical volume, when it is determined, based on the copy information and the update information, that the old data in the unit area of the first logical volume is already copied to the second logical volume and the write request to write the new data to the unit area of the first logical volume is already received at the time of reception of the second pair creating request;
  avoid copying, to the first logical volume, data in the unit area of the second logical volume that corresponds to the unit area of the first logical volume, when it is determined, based on the copy information and the update information, that the old data in the unit area of the first logical volume is already copied to the second logical volume and the write request to write the new data to the unit area of the first logical volume is not received yet at the time of reception of the second pair creating request;
  avoid copying, to the first logical volume, data in the unit area of the second logical volume that corresponds to the unit area of the first logical volume, when it is determined, based on the copy information and the update information, that the old data in the unit area of the first logical volume is not copied to the second logical volume yet at the time of reception of the second pair creating request; and discard the new data stored on the second side when it is determined, based on the copy information and the update information, that the old data in the unit area of the first logical volume is not copied to the second logical volume yet at the time of reception of the second pair creating request, and when the new data is stored on the second side.

7. A control method for a storage system, the storage system comprising a processor, a processor memory, a cache memory, and a storage apparatus, the storage system being coupled to a host computer in a manner that allows communication between the storage system and the host computer, the storage apparatus having a storage area comprising a first logical volume and a second logical volume, the control method comprising:

a first step of receiving, by the processor, a first pair creating request at a first point in time for storing data of the first logical volume at the first point in time in the second logical volume;

a second step of receiving, by the processor, a write request to the first logical volume after the first point in time;

a third step of storing, by the processor, in the cache memory, new data of the write request, the new data of the write request to be written over old data related to the write request;

a fourth step of receiving, by the processor, a second pair creating request at a second point in time for storing data in one of the first logical volume and the second logical volume at the second point in time in another one of the first logical volume and the second logical volume; and a fifth step of omitting copying, by the processor, to the second logical volume, the old data, related to the write request, that is in the first logical volume at the first point in time if the old data is stored in the cache memory and is not copied to the second logical volume yet at the second point in time and the write request is received before the second point in time.

8. The control method according to claim 7, wherein the first logical volume has a storage area comprising a unit area storing the old data, the second logical volume has a storage area comprising a unit area, and the unit area of the first logical volume and the unit area of the second logical volume correspond to each other, wherein a storage area of the cache memory comprises a first side and a second side, which are associated with each other, wherein the third step comprises storing, by the processor, the new data, when the write request to write the new data in the unit area of the first logical volume is received after the reception of the first pair creating request and before the old data that is in the unit area of the first logical volume at the time of reception of the first pair creating request is copied to the second logical volume, in the second side that is associated with the first side where the old data that is in the unit area of the first logical volume at the time of reception of the first pair creating request is stored, and wherein the fifth step comprises copying, by the processor, to the second logical volume, present data in the unit area of the first logical volume that is generated by combining the old data stored on the first side and the new data stored on the second side, instead of copying the old data stored on the first side to the second logical volume, when the new data is stored on the second side and the old data on the first side is not copied to the second logical volume yet at a time of reception of a second pair creating request for storing, in the second logical volume, the same data that is stored at present in the first logical volume.

9. The control method according to claim 8, wherein the processor memory is configured to hold copy information and update information, the copy information indicating whether or not the old data that is in the unit area of the first logical volume at the time of reception of the first pair creating request has been copied to the second logical volume, the update information indicating whether or not the write request to write the new data to the unit area of the first logical volume has been received after the reception of the first pair creating request, and wherein the fifth step comprises:

avoiding copying, by the processor, the old data stored on the first side to the second logical volume when it is determined, based on the copy information and the update information, that the old data in the unit area of the first logical volume is already copied to the second logical volume and the request to write the new data to the unit area of the first logical volume is not received yet at the time of reception of the second pair creating request;

copying, by the processor, the old data stored on the first side to the second logical volume when it is determined, based on the copy information and the update information, that the old data in the unit area of the first logical volume is not copied to the second logical volume yet and the write request to write the new data to the unit area of the first logical volume is not received yet at the time of reception of the second pair creating request;

copying, by the processor, to the second logical volume, present data in the unit area of the first logical volume that is generated by combining the old data stored on the first side and the new data stored on the second side, when it is determined, based on the copy information and the update information, that the old data in the unit area of the first logical volume is already copied to the second logical volume and the write request to write the new data to the unit area of the first logical volume is already received at the time of reception of the second pair creating request; and copying, by the processor, to the second logical volume, present data in the unit area of the first logical volume that is generated by combining the old data stored on the first side and the new data stored on the second side, instead of copying the old data stored on the first side to the second logical volume, when it is determined, based on the copy information and the update information, that the old data in the unit area of the first logical volume is not copied to the second logical volume yet and the write request to write the new data to the unit area of the first logical volume is already received at the time of reception of the second pair creating request.

10. The control method according to claim 7, wherein the first logical volume has a storage area comprising a unit area storing old data, the second logical volume has a storage area comprising a unit area, and the unit area of the first logical volume and the unit area of the second logical volume correspond to each other, wherein a storage area of the cache memory comprises a first side and a second side, which are associated with each other, wherein the first step comprises storing, by the processor, the new data, when the write request to write the new data in the unit area of the first logical volume is received after the reception of the first pair creating request and before the old data that is in the unit area of the first logical volume at the time of reception of the first pair creating request is copied to the second logical volume, in the second side that is associated with the first side where the old data that is in the unit area of the first logical volume at the time of reception of the first pair creating request is stored, and wherein the second step comprises discarding, by the processor, the new data stored on the second side, instead of copying the old data stored on the first side to the second logical volume, when the new data is stored on the second side and the old data on the first side is not copied to the second logical volume yet at a time of reception of a second pair creating request for storing, in the first logical volume, the same data that is in the second logical volume at present.

11. The control method according to claim 10, wherein the processor memory is configured to hold copy information, which indicates whether or not the old data that is in the unit area of the first logical volume at the time of reception of the first pair creating request has been copied to the second logical volume, and wherein the second step comprises:

copying, by the processor, to the first logical volume, data in the unit area of the second logical volume that corresponds to the unit area of the first logical volume when it is determined, based on the copy information, that the old data in the unit area of the first logical volume is already copied to the second logical volume at the time of reception of the second pair creating request;

avoiding copying, by the processor to the first logical volume, data in the unit area of the second logical volume that corresponds to the unit area of the first logical volume when it is determined, based on the copy information, that the old data in the unit area of the first logical volume is not copied to the second logical volume yet at the time of reception of the second pair creating request; and discarding, by the processor, the new data stored on the second side when it is determined, based on the copy information, that the old data in the unit area of the first logical volume is not copied to the second logical volume yet at the time of reception of the second pair creating request, and when the new data is stored on the second side.

12. The control method according to claim 10, wherein the processor memory is configured to hold copy information and update information, the copy information indicating whether or not the old data that is in the unit area of the first logical volume at the time of reception of the first pair creating request has been copied to the second logical volume, the update information indicating whether or not the write request to write the new data to the unit area of the first logical volume has been received after the reception of the first pair creating request, and wherein the second step comprises:

copying, by the processor, to the first logical volume, data in the unit area of the second logical volume that corresponds to the unit area of the first logical volume when it is determined, based on the copy information and the update information, that the old data in the unit area of the first logical volume is already copied to the second logical volume and the write request to write the new data to the unit area of the first logical volume is already received at the time of reception of the second pair creating request;

avoiding copying, by the processor, to the first logical volume, data in the unit area of the second logical volume that corresponds to the unit area of the first logical volume when it is determined, based on the copy information and the update information, that the old data in the unit area of the first logical volume is already copied to the second logical volume and the write request to write the new data to the unit area of the first logical volume is not received yet at the time of reception of the second pair creating request;

avoiding copying, by the processor, to the first logical volume, data in the unit area of the second logical volume that corresponds to the unit area of the first logical volume when it is determined, based on the copy information and the update information, that the old data in the unit area of the first logical volume is not copied to the second logical volume yet at the time of reception of the second pair creating request; and discarding, by the processor, the new data stored on the second side when it is determined, based on the copy information and the update information, that the old data in the unit area of the first logical volume is not copied to the second logical volume yet at the time of reception of the second pair creating request, and when the new data is stored on the second side.

* * * * *